US012755548B1

(12) United States Patent
Clements et al.

(10) Patent No.: US 12,755,548 B1
(45) Date of Patent: Oct. 6, 2026

(54) SYSTEM AND METHOD FOR PROVIDING IMAGE-BASED SECURITY

(71) Applicant: Strategic Online Systems, Inc., Collierville, TN (US)

(72) Inventors: Benjamin Philip Clements, Collierville, TN (US); Barry Leon Etter, Mocksville, NC (US); Silas Hoyt Hollingsworth, Rossville, TN (US)

(73) Assignee: Strategic Online Systems, Inc., Collierville, TN (US)

( * ) Notice: Subject to any disclaimer, the term of this patent is extended or adjusted under 35 U.S.C. 154(b) by 132 days.

(21) Appl. No.: 18/758,858

(22) Filed: Jun. 28, 2024

Related U.S. Application Data

(60) Provisional application No. 63/524,366, filed on Jun. 30, 2023.

(51) Int. Cl.
*G06V 20/52* (2022.01)
*G06T 7/70* (2017.01)
*G08B 21/02* (2006.01)

(52) U.S. Cl.
CPC ................ *G06V 20/52* (2022.01); *G06T 7/70* (2017.01); *G08B 21/02* (2013.01); *G06V 2201/07* (2022.01)

(58) Field of Classification Search
None
See application file for complete search history.

(56) References Cited

U.S. PATENT DOCUMENTS

| | | | | |
|---|---|---|---|---|
| 2020/0226892 | A1* | 7/2020 | Coles | G08B 5/38 |
| 2023/0293113 | A1* | 9/2023 | Sehgal | G16H 50/20 |

OTHER PUBLICATIONS smartsentryai.com, "SentryAI Guard", accessed Aug. 27, 2024, website, https://smartsentryai.com/.
cctvcamerapros.com, "Alarm Security Camera", accessed Aug. 27, 2024, website, https://www.cctvcamerapros.com/Alarm-Security-Camera-p/ip-ax4d.htm.
icetana.ai, "Icetana AI Suite", accessed Aug. 27, 2024, website, https://www.icetana.ai/.
actuate.ai, "Actuate Real-Time AI Video Analytics", accessed Aug. 27, 2024, website, https://actuate.ai/.
(Continued)

*Primary Examiner* — Thomas S McCormack
(74) *Attorney, Agent, or Firm* — Baker, Donelson, Bearman, Caldwell & Berkowitz, P.C.; Dominic A. Rota; Wesley M. Barbee

(57) ABSTRACT

A system and method of monitoring security of a facility with a plurality of image sources and a security server. The server may be configured to receive one or more images; identify, via an object-detecting application, one or more objects in the one or more images based upon one or more object descriptors associated with the identified one or more objects; generate a facility dashboard display including a visual display mapping to each of the plurality of image sources; apply business logic rules to the identified one or more objects in the one or more images to detect a security incident on at least one of one or more locations in the facility; and communicate an alert of the detected security incident on the facility dashboard display to indicate a security event in the at least one of the one or more locations in the facility.

18 Claims, 22 Drawing Sheets

(56) References Cited

OTHER PUBLICATIONS pentegrasystems.com, "AI-Powered Security Monitoring Software", accessed Aug. 27, 2024, website, https://www.pentegrasystems.com/ai-powered-security-monitoring-software/.
amazon.com, "4K Security WiFi Camera Outdoor with Three Lens", accessed Aug. 27, 2024, website, https://www.amazon.com/GAIEXCE-Security-Outdoor-Tracking-Detection/dp/B0D4TZC198/ref=sr_1_10?dib=eyJ2ljoiMSJ9.mZIf6589VTQzwHFxjetBTPSqVXXIK4AdnIK07R3t4jkEtY7HmSrhCctiwyv34tKIFUUbTgVsEMOmcf--r9MtQMdL9VkBLCnKBc55T4wpJFj69MzBQMwaK6fz64illq7OMumUPUmK6loFy2Jd4Q8ZLKTWXvMIp4Vm2oneWxRM9vBIVOWxEeztmqxyKsLaag5dLFeTTWzFwndzqun0zbhob6fGxjt45FFjji-Be_Jm3g.

* cited by examiner

600

900

1000

SYSTEM AND METHOD FOR PROVIDING IMAGE-BASED SECURITY

SYSTEM AND METHOD FOR PROVIDING IMAGE-BASED SECURITY

A portion of the disclosure of this patent document contains material that is subject to copyright protection. The copyright owner has no objection to the reproduction of the patent document or the patent disclosure, as it appears in the U.S. Patent and Trademark Office patent file or records, but otherwise reserves all copyright rights whatsoever.

CROSS-REFERENCE TO RELATED APPLICATIONS

The present application claims priority to, and benefit from, a U.S. provisional patent application filed on Jun. 30, 2023, identified as U.S. Appl. No. 63/524,366, and which is incorporated by reference in its entirety.

FIELD OF THE DISCLOSURE

This application relates in general to a system and method for providing facility security, and more specifically, to a system and method for providing image-based facility security with a smart visual display.

BACKGROUND

This section is intended to introduce various aspects of the art, which may be associated with exemplary embodiments of the present disclosure. This discussion is believed to assist in providing a framework to facilitate a better understanding of particular aspects of the present disclosure. Accordingly, it should be understood that this section should be read in this light, and not necessarily as admissions of prior art.

Physical security of facilities typically uses cameras, whether as photographic cameras or video cameras, such as camcorders, to permit professionals to monitor what is occurring within various spaces of a facility. This approach generates large amounts of data that make it difficult to provide real-time automated analysis of the spaces to detect occurrence of objects and events in need of a timely response. Often, for the physical security of facilities that use photographic cameras or video cameras, these facilities rely on locally implemented closed-circuit television (CCTV), or other means of video surveillance, in which the cameras transmit a signal to a limited set of display devices or monitors, often located, at least in part, in a centralized control room of the facility. In the context of locally implemented means of video surveillance, facilities often rely on a manual approach to view a large number of image sources, thereby requiring professionals to simultaneously monitor all of the areas of a facility, or at least those areas falling within the field of view of each camera. By taking said manual approach, a professional may inadvertently or unintentionally fail to identify or detect a potential, threatened, imminent, or actual security incident or event, or fail to identify or detect an occurrence of an object in need of a timely response. This approach also may impose significant costs to utilize enough professional monitoring agents to monitor all of these image sources.

Current efforts to process digital images to identify events, objects, and people in order to then determine whether an alarm or notification of a need to intervene have proven difficult, especially as the number of image sources grow to cover multiple locations from more than one point of view. The processing requirements to algorithmically determine the presence of events, objects, and people of interest in real-time have also added to the difficulty in scaling the number of supported image sources to needed levels. New approaches are required if supporting more than a small number of sources of images is to be required and the numbers of different events, objects, and people are simultaneously limited.

Therefore, a need exists for a system and method providing image-based facility security with a smart visual display. The present disclosure attempts to address the limitations and deficiencies in prior solutions according to the principles and embodiments disclosed herein.

SUMMARY

In accordance with the present disclosure, the above and other problems are solved by providing a system and method for image-based facility security according to the principles and example embodiments disclosed herein.

A method for monitoring security of a facility is provided herein. The method may comprise receiving one or more images captured by a plurality of image sources, each of the plurality of image sources having a corresponding field-of-view of one or more locations in a facility; identifying, via an object-detecting application, one or more objects in the captured one or more images based upon one or more object descriptors associated with the identified one or more objects; generating a facility dashboard display, the dashboard display including a visual display mapping to each of the plurality of image sources having a corresponding field-of-view of the one or more locations in the facility; applying business logic rules to the identified one or more objects in the captured one or more images to detect a potential, threatened, imminent, or actual security incident in the at least one of the one more locations in the facility; and communicating an alert of the detected potential, threatened, imminent, or actual security incident on the facility dashboard display to indicate a security event in the at least one of the one or more locations in the facility.

In one aspect according to the above-referenced embodiment, the one or more objects may include any person, vehicle, or item configured to be identifiable by the object-detecting application.

In another aspect according to the above-referenced embodiment, each of the plurality of image sources may comprise an imaging device that captures a digital image of one of the one or more locations in the facility having a defined field-of-view.

In another aspect according to the above-referenced embodiment, the one or more object descriptors may include at least one of an image source identity, a location of the object within the captured image, an object type associated with the object, a visual characteristic associated with the object type, and/or a timestamp corresponding to a time at which the image containing the identified one or more objects was captured.

In another aspect according to the above-referenced embodiment, generating the alert may comprise visually altering the at least one of the one or more locations on the facility dashboard display by marking the one or more locations with a distinct color.

In another aspect according to the above-referenced embodiment, the facility dashboard display may comprise an output on a user device, whereby a user may be capable of selecting a digital image from one of the plurality of image sources when the user selects at least one of the one or more locations in the facility.

In another aspect according to the above-referenced embodiment, the method may further comprise displaying a spatial relationship of a field-of-view corresponding to the selected at least one of the one or more locations relative to a digital image corresponding to an adjacent at least one of the one or more locations.

In another aspect according to the above-referenced embodiment, the method may further comprise selectively retrieving, from a database, business logic rules comprising at least one or more of logic equations using the one or more object descriptors.

In another aspect according to the above-referenced embodiment, the object-detecting application may be modeled under principles of artificial intelligence (AI) prescribed to the one or more object descriptors.

In another aspect according to the above-referenced embodiment, the communicated alert may be output to a user device capable of accessing the generated facility dashboard display.

A system for monitoring security of a facility is provided herein. The system may comprise a plurality of image sources and a security server. The plurality of image sources may each have a corresponding field-of-view of one or more locations in a facility. The security server may be communicatively coupled to the plurality of image sources. The security server may be configured to receive one or more images captured by the plurality of image sources; identify, via an object-detecting application, one or more objects in the captured one or more images based upon one or more object descriptors associated with the identified one or more objects; generate a facility dashboard display, the dashboard display including a visual display mapping to each of the plurality of image sources having a corresponding field-of-view of the one or more locations in the facility; apply business logic rules to the identified one or more objects in the captured one or more images to detect a potential, threatened, imminent, or actual security incident on at least one of the one or more locations in the facility; and communicate an alert of the detected potential, threatened, imminent, or actual security incident on the facility dashboard display to indicate a security event in the at least one of the one or more locations in the facility.

In another aspect according to the above-referenced embodiment, the one or more objects may include any person, vehicle, or item configured to be identifiable by the object-detecting application.

In another aspect according to the above-referenced embodiment, each of the plurality of image sources may comprise an imaging device that captures a digital image of one of the one or more locations of the facility having a defined field-of-view.

In another aspect according to the above-referenced embodiment, the one or more object descriptors may include at least one of an image source identity, a location of the object within the captured image, an object type associated with the object, a visual characteristic associated with the object type, and/or a timestamp corresponding to a time at which the image containing the identified one or more objects was captured.

In another aspect according to the above-referenced embodiment, generating the alert may comprise visually altering the at least one of the one or more locations on the facility dashboard display by marking the one or more locations with a distinct color.

In another aspect according to the above-referenced embodiment, the facility dashboard display may comprise an output on a user device, whereby a user may be capable of selecting a digital image from one of the plurality of image sources when the user selects at least one of the one or more locations in the facility.

In another aspect according to the above-referenced embodiment, the security server may be configured to display a spatial relationship of a field-of-view corresponding to the selected at least one of the one or more locations relative to a digital image corresponding to an adjacent at least one of the one or more locations.

In another aspect according to the above-referenced embodiment, the security server may be configured to selectively retrieve, from a database, business logic rules comprising at least one or more of logic equations using the one or more object descriptors.

In another aspect according to the above-referenced embodiment, the object-detecting application may be modeled under principles of artificial intelligence (AI) prescribed to the one or more object descriptors.

In another aspect according to the above-referenced embodiment, the communicated alert may be output to a user device capable of accessing the generated facility dashboard.

The foregoing has outlined rather broadly the features and technical advantages of the present disclosure in order that the detailed description of the disclosure that follows may be better understood. Additional features and advantages of the disclosure will be described hereinafter that form the subject of the claims of the disclosure.

It should be appreciated by those skilled in the art that the conception and specific embodiment disclosed may be readily utilized as a basis for modifying or designing other structures for carrying out the same purposes of the present disclosure. It also should be realized by those skilled in the art that such equivalent constructions do not depart from the spirit and scope of the disclosure as set forth in the appended claims. The novel features that are believed to be characteristic of the disclosure, both as to its organization and method of operation, together with further objects and advantages will be better understood from the following description when considered in connection with the accompanying figures. It is to be expressly understood, however, that each of the figures is provided for the purpose of illustration and description only and is not intended as a definition of the limits of the present disclosure.

BRIEF DESCRIPTION OF THE DRAWINGS

Referring now to the drawings in which like reference numbers represent corresponding parts throughout.

DETAILED DESCRIPTION

Figure 1:
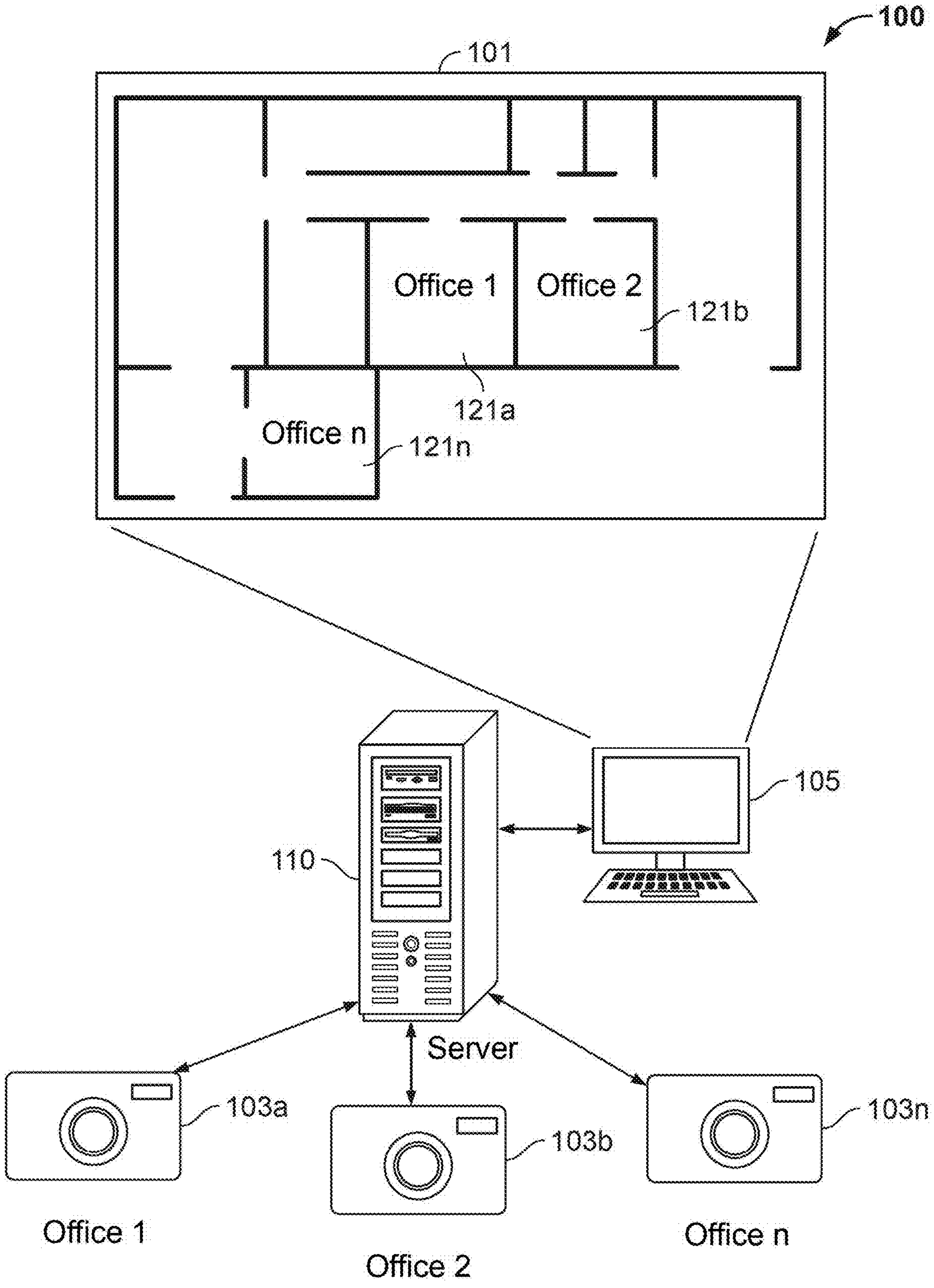
FIG. 1 illustrates an embodiment of a system providing image-based facility security with a smart visual display according to the present disclosure.

This application relates in general to a system and method of facility security, and more specifically, to a system and method providing image-based facility security with a smart visual display according to the present disclosure.

So that the manner in which the present application can be better understood, certain illustrations and figures are appended hereto. It is to be noted, however, that the drawings illustrate only selected embodiments and elements of the systems and methods described herein and are therefore not to be considered limiting in scope for the systems and methods as described herein may admit to other equally effective embodiments and applications. Various embodiments of the present disclosure will be described in detail with reference to the drawings having like reference numerals represent like parts and assemblies throughout the several views. Reference to various embodiments does not limit the scope of the disclosure, which is limited only by the scope of the claims attached hereto. Additionally, any examples set forth in this specification are not intended to be limiting and merely set forth some of the many possible embodiments for the claimed disclosure.

In describing embodiments of the present disclosure, the following terminology will be used. The singular forms "a," "an," and "the" include plural referents unless the context clearly dictates otherwise. As used herein, a plurality of items, structural elements, compositional elements, and/or materials may be presented in a common list for convenience. However, these lists should be construed as though each member of the list is individually identified as a separate and unique member. Thus, no individual member of such list should be construed as a de facto equivalent of any other member of the same list solely based on their presentation in a common group without indications to the contrary. As used herein, the singular forms "a," "an," and "the" are intended to include the plural forms as well, unless the context clearly indicates otherwise.

It further will be understood that the terms "comprises," "comprising," "includes," and "including" specify the presence of stated features, steps, or components, but do not preclude the presence or addition of one or more other features, steps or components. It also should be noted that in some alternative implementations, the functions and acts noted may occur out of the order noted in the figures. For example, two figures shown in succession may in fact be executed substantially concurrently or may sometimes be executed in the reverse order, depending upon the functionality and acts involved.

The terms "individual," "user," and "monitoring user" refer to an entity, e.g., a human, using a system and method providing image-based facility security with a smart visual display according to the present disclosure. The term "user" herein refers to one or more individuals, users, or monitoring users.

Figure 2:
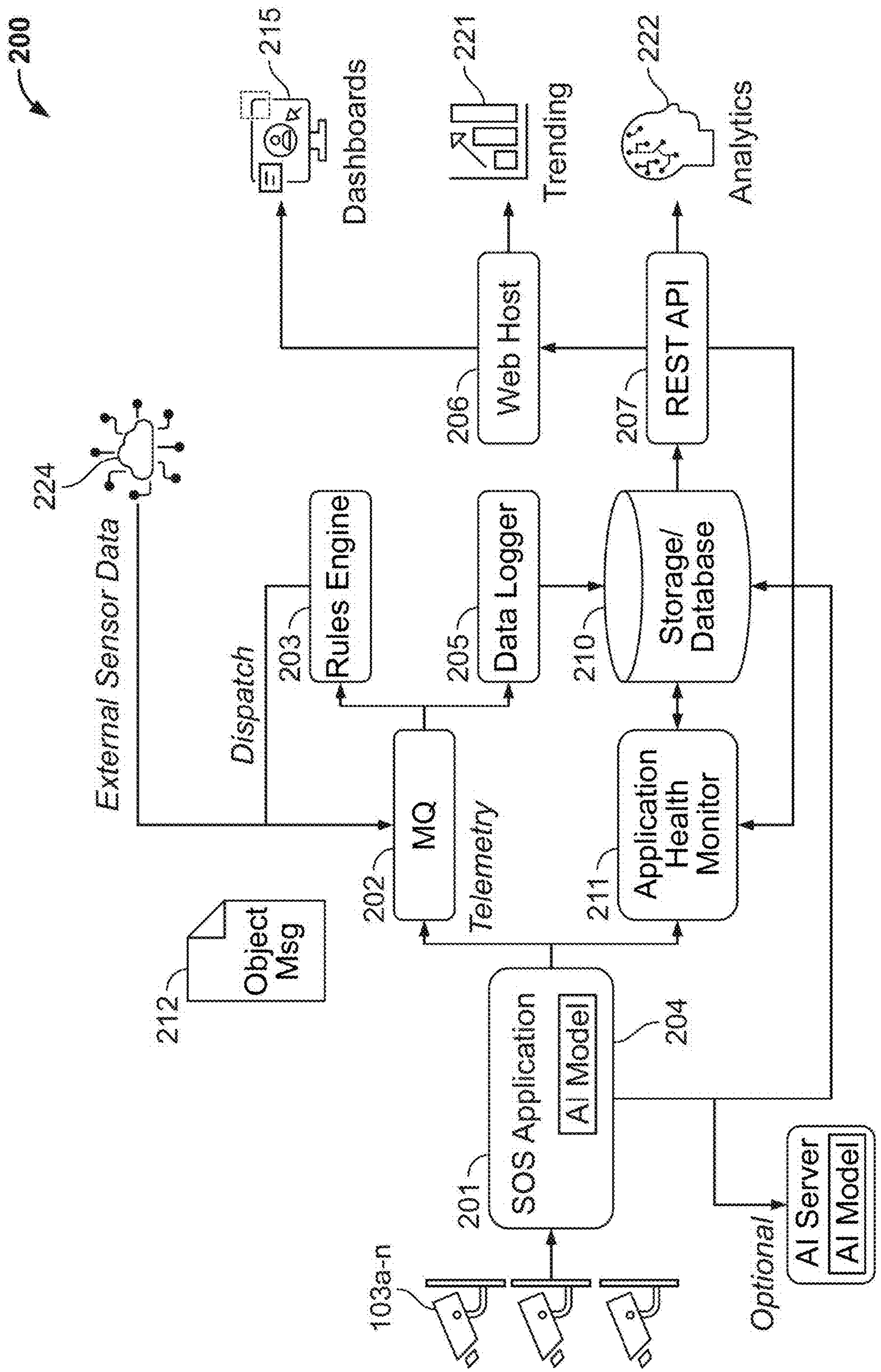
FIG. 2 illustrates a processing block diagram of data flow in a system providing image-based facility security with a smart visual display according to the present disclosure.

In general, the present disclosure relates to a system and method providing image-based facility security with a smart visual display. To better understand the present disclosure, FIG. 1 illustrates an exemplary embodiment of a system providing image-based facility security 100 with a smart visual display according to the present disclosure. A facility security system 100 may be utilized to automatically process digital images captured by a plurality of image sources 103*a-n* in which the image sources 103*a-n* cover corresponding fields-of-view of a facility being monitored. The facility security system 100 may be implemented in a variety of facilities, including educational institutions, shopping centers, residential habitations, or commercial complexes. The facility security system 100 includes a plurality of image sources 103*a-n* communicatively coupled to a security server 110 to generate a facility dashboard 215 (as depicted in FIG. 2) output to a display associated with a monitoring user device 105. A monitoring user views a visual display 101, or a blueprint 101, corresponding to locations of a facility being monitored in which the image sources 103*a-n* include fields-of-view 121*a-n* of the locations to be monitored. One or more of the image sources 103*a-n* may comprise an imaging device that captures a digital image of a location of a facility having a defined field-of-view. Examples of said imaging device may include a digital camera, a video camera, or a camcorder, as well as other cameras, including a digital single-lens reflex (DSLR) cameras, bridge cameras, camera phones, and point-and-shoot cameras. The image source may generate a digital image at a rate of images per second, or, in other embodiments, the rate of image capture may be determined using one or more factors including current time of day, current day of the week, the location of the captured field-of-view of a facility, presence of detected alarms in certain locations of a facility, and monitoring user input controls. Each digital image captured by the image sources 103*a-n* may have raw image data associated therewith, such as data pertaining to a timestamp of when the digital image was captured.

The blueprint 101 presents to the monitoring user a visual representation of the facility in which one or more fields-of-view 121*a-n* in which an object is detected in a digital image from one or more image sources 103*a-n*. An object may comprise any item visually detected by one or more image sources 103*a-n* within one digital image. As shall be discussed further below, the object may be represented by object descriptors including an object type associated with the object, visual characteristics associated with the object type, and, in optional embodiments, a timestamp corresponding to a point in time at which the one digital image containing the object was captured.

In embodiments of the facility security system 100, a location within the blueprint 101 is visually altered to indicate the detection of the object within a corresponding field-of-view 121*a-n*. For example, when a person is detected in office 2 121*b* or when an object is detected in a digital image from image sources 103*b*, the corresponding location 121*b* on the blueprint 101 on the display of the monitoring user device 105 may be marked by a different colored, or otherwise visually differentiated, background. In a preferred embodiment, a current digital image from an image source, such as the image source 103*b*, also may be displayed on the display monitoring user device 105 with the facility dashboard 215 when the monitoring user clicks a cursor within office 2 121*b* of the blueprint 101. In other embodiments, the facility dashboard 215 may include the blueprint 101 and the current digital image from all image sources 103*a-n* in which an object is detected and one or more additional conditions within a business logic rule are satisfied. Using business logic rules, as discussed further in reference to FIGS. 2 and 12-13, a facility security system 100 may be configured to present a monitoring user with the facility dashboard 215 on the display of the monitoring user device 105 containing relevant data on the blueprint 101 as well as current digital images corresponding to relevant conditions detected within the facility.

FIG. 2 illustrates a processing block diagram of data flow 200 in a system providing image-based facility security with a smart visual display according to the present disclosure. The facility security system 100 uses the system data flow 200 to receive digital images from a plurality of image sources 103*a-n*, to identify objects in the digital images and to determine whether an alert to a monitoring user is generated. The digital images may be captured by one or more of the image sources 103*a-n* and transmitted to the security server a 110. As illustrated in FIG. 1, the security server 110 may constitute a programmable computing device communicatively coupled to the one or more image sources 103*a-n* concurrently running one or more software components, including an application 201 using one or more AI models 204. The digital images may be received and first processed by the application 201. Each AI model 204 is trained to identify one or more object types as disclosed in more detail in reference to FIG. 3 herein. In optional embodiments, the application 201 having one or more AI models 204 may be communicatively coupled with a server having other AI models residing thereon, and which may be accessed through the communicative coupling between the application 201 and the server.

The objects detected by the AI model 204 possess object descriptors including an image source 103*a-n* identity, a location of the object within the digital image, an object type, and a timestamp associated with the capture of the object found in the digital image. The object data is contained within an object detection message 212. All object detection messages 212 are submitted to a message broker message queue 202 and the app health monitor 211. The app health monitor 211 uses the object detection message 212 to determine the operating status of the image sources 103*a-c*. The app health monitor 211 stores all of the object detection messages 212 within a database 210 for later searching and retrieval. The database 210 may constitute a data storage system containing data associated with each object detected in a digital image that may be searchable using one or more of the object descriptors. The data storage system may be organized using a data organization and record structure that provides an efficient searching platform.

The message broker message queue 202 functions as a broker of data, insofar as it operates as a data-transfer and sharing mechanism used to provide object data, event confirmation data, business logic rule occurrences, and other facility related data generated by components of the facility security system that may be utilized by other components of the facility security system. In optional embodiments, the event confirmation data may comprise a detection of an object in a predefined number of digital images within a series of sequential digital images from a particular image source about a point in time. The event confirmation may comprise one or more business logic rules associated with the object, the image source, and the time of image capture, as further discussed below.

The message broker message queue 202 processes the object detection message 212 to provide data of all detected objects to a business logic rules engine 203 and a data logger 205. The message broker message queue 202 may employ unified, high-throughput, and low-latency data transmission, such as Apache Kafka or other pipelines or applications for real-time streaming of data, including image-based data derived from image sources 103*a-n*. The message broker message queue 202 may, for a given period of time, retain limited storage of object detection messages 212. During this retention period, other components, such as the web host 206 and the rest API 207, can query the message broker data (e.g., object detection messages 212) of the message broker message queue 202. In circumstances where the broker message queue 202 exceeds limited storage of the object detection messages 212, or to the extent the given period of time lapses, the data logger 205 may obtain, from the object detection messages 212, high-priority data and aggregated data to a long-term database for historical reporting, such as the database 210. Thus, trending and historical reporting can go beyond the limitations of the message broker message queue 202 by using the database 210 as the query source.

The data logger 205 retrieves all of the object detection messages 212 from the message broker queue 202, and the data logger 205 stores the object detection messages 212 in the database 210 as described above. In optional embodiments, the data logger 205 may perform extract-transform-load (ETL) logic on the object detection message 212, in which data of the object detection messages 212 are combined and transferred to a data warehouse, such as the database 210. In other optional embodiments, the data logger 205 may employ ETL logic, such that the data of the object detection messages 212 are aggregated, or made cumulative, prior to transfer to the database 210. In yet further optional embodiments, the data logger 205 may also sanitize, clean, or scrub data from the object detection messages 212, so as to ensure the data is correct and does not contain information otherwise incomplete, incorrect, or irrelevant for storage on the database 210.

The business logic rules engine 203 applies a plurality of business logic rules to the object detection message 212 to determine what, if any, other action is to be taken in response to the detection of the object referenced in the object detection message 212. In optional embodiments, the business logic rules may include a Boolean logic equation using object descriptors, image source identity and field-of-view, time, day, and date of image capture as well as other related information known about a detected object. Operation of the business logic rules engine 203 is disclosed in detail in reference to FIGS. 4-17 herein. Based upon the business logic rules, events, alerts, and related data items are dispatched by the business logic rules engine 203 to the message broker message queue 202 for transmission to the other software components in the facility security system 100.

The message broker message queue 202 posts object detection messages 212 that are retrieved by the web host 206 and REST API 207 permitting the generation of data and alarms to monitoring users in various formats. Formats may include a facility dashboard 215, trending data 221, and analytics data 222.

The facility security system 100 may generate digital images from image sources 103*a-n* periodically, so as to repeat the identification of objects by the application 201 and subsequent processing through the message broker message queue 202 and business logic rules engine 203. The subsequently captured digital images from each image source 103*a-n* may have business logic rules applied by the business logic rules engine 203. Each of the captured digital images, the raw data of which is communicated in object detection messages 212, may be used in data displayed to monitoring users in the facility dashboard 215 and the display of the monitoring user device 105, and may be stored within the database 210 for later retrieval when identified in a search query based upon an object descriptor such as an object type and a timestamp. A sequence of digital images from each image source 103*a-n* may be replayed as an image sequence clip as further discussed below. The dataflow 200 of the facility security system 100 processes each captured digital image one at a time rather than considering the data from the image sources 103*a-n* to be video data. The rate of image capture may vary as needed; for example, the captured images may be generated at a lower first rate when no objects are detected but may be increased when an object is detected using the business logic rules of the business logic rules engine 203. The image capture rate also may be determined by a defined schedule using the date, day of the week, and time at which the images are captured. The rate of capture may be controlled by the security server 110 transmitting a control signal to each of the image sources 103*a-n* individually, and also may be controlled by processing a subset of captured images from the image sources 103*a-n* while dropping the remaining digital images.

Figure 3:
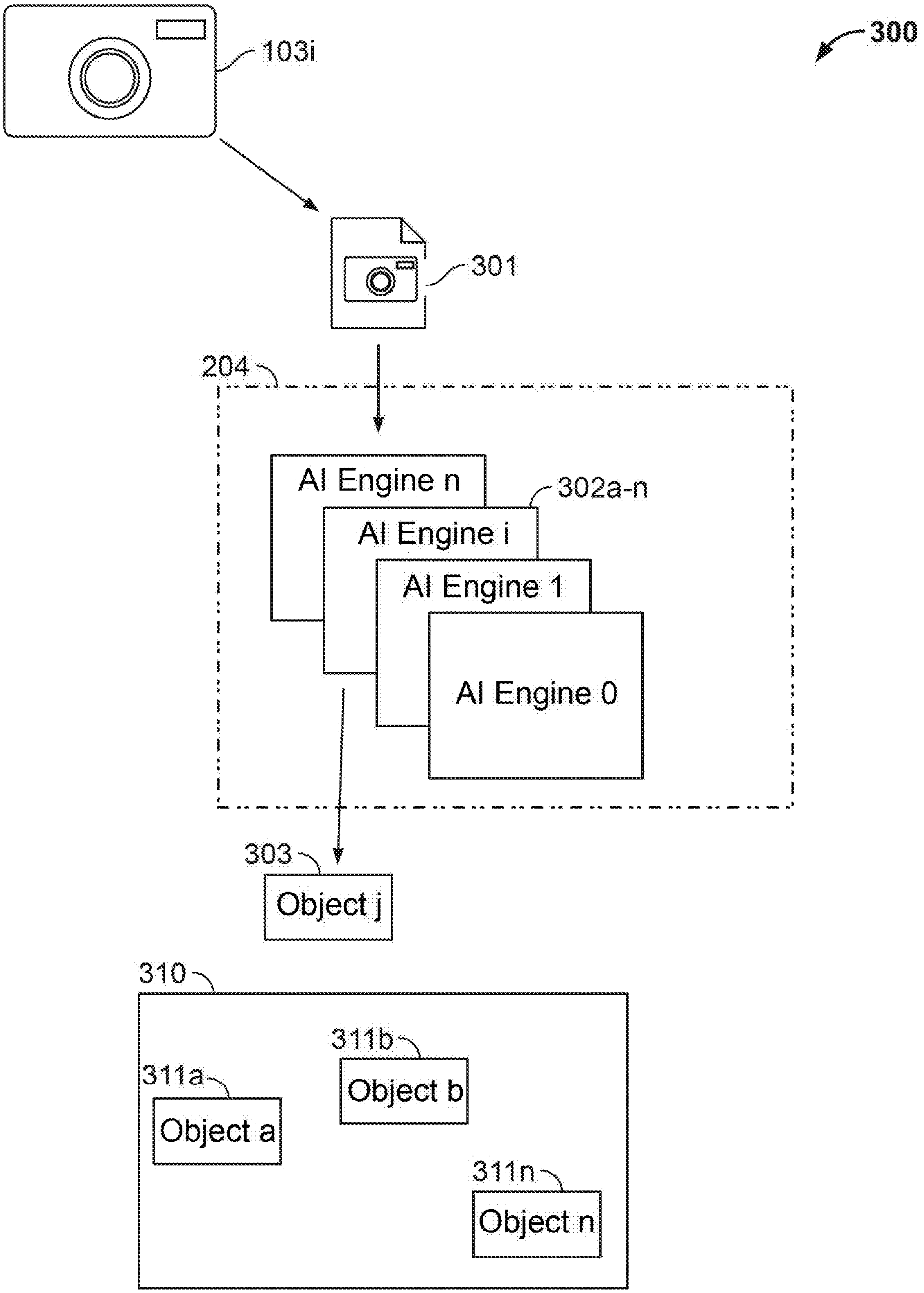
FIG. 3 illustrates an embodiment of object-identification processing of an image to provide image-based facility security with a smart visual display according to the present disclosure.

FIG. 3 illustrates object identification processing of an image to provide image-based facility security with a smart visual display according to the present disclosure. A digital image 301 is generated by an image source 103*i* as described herein. The digital image 301 is simultaneously processed by a plurality of AI engines 302*a-n*, each of which may be executed independently, or in conjunction with one another, under the AI model 204. Each of the individual AI engines 302*a-n* is trained to identify a particular object type including people, bags, weapons, and similar objects. The number of AI engines 302*a-n* utilized in the facility security system 100 and the object types to be detected may be specified to meet a particular set of needs for each facility being protected using the facility security system 100.

Figure 4:
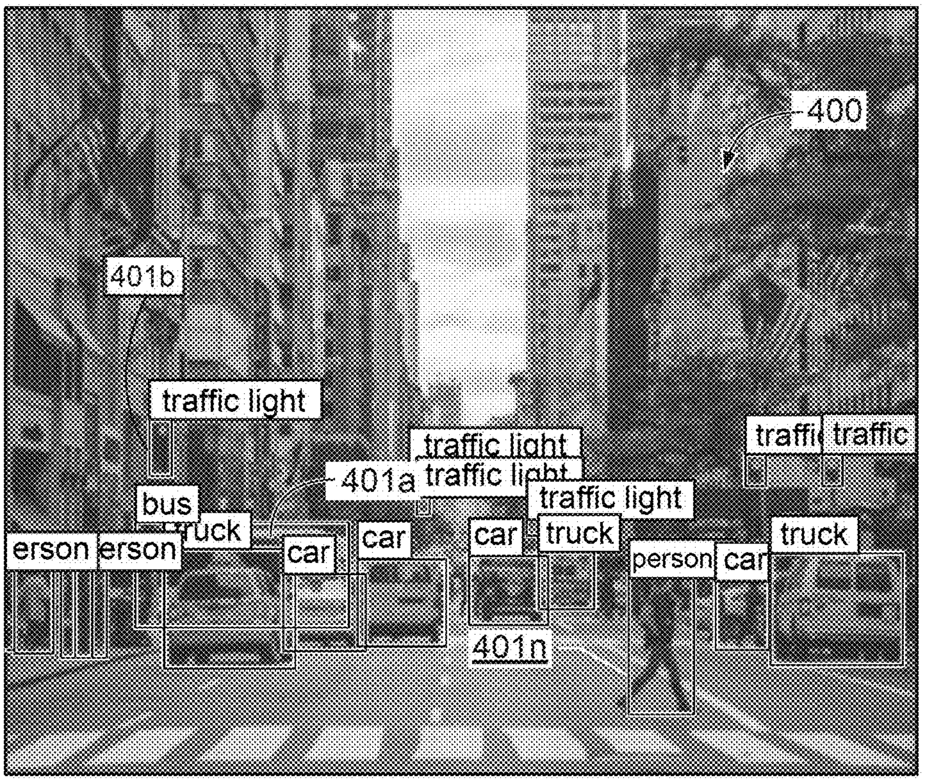
FIG. 4 illustrates an embodiment of an image having a plurality of identified objects in a system providing image-based facility security with a smart visual display according to the present disclosure.

Each of the AI engines 302*a-n* operate under principles of artificially intelligent training and learning. The AI engine 302*a-n* leverages machine-learning (ML) principles, which focus on learning and improvement repetitious or ongoing experiences, and deep-learning (DL) principles, which focuses on algorithms or neural networks to train a model. All in all, the AI employs principles of ML and DL to initiate intelligent human-like cognitive behavior, such as the detection of a potential, threatened, imminent, or actual security incident or event, or a detection of an occurrence of an object in need of a timely response. In the context of the facility security system 100, the AI engines 302*a-n* leverage ML and DL to detect various common objects captured, or otherwise detected, by image source 103*i*, including a human individual, vehicle, bag (or other item for storing goods), license plate (and license plate number), and threatening or menacing objects, such as firearms or sharp instruments. Each of the AI engines 302*a-n* may derive from open-source, or publicly available, neural networks as applied to certain objects, or each of the AI engines 302*a-n* may otherwise be proprietarily developed through training of the AI engines 302*a-n* as applied to the facility on which the facility security system 100 has been deployed. The training processes utilized may vary to be tailored to the identification of a particular object type. Once trained, each AI engine 302*a-n* generates an object detection message 212 corresponding to a detected object 303. In any particular captured image 310, multiple objects 311*a-n* may be identified at various locations within the captured image 310. Training one or more of the AI engines 302*a-n* of the AI model 204 may involve obtaining whether pre-loaded on the application 201 or otherwise derived from one or more image sources 103*i* on a rolling basis-a robust data set of example images that contain the object of interest, such as one or more of the multiple objects 311*a-n*. Each image may be annotated by drawing a bounding box around each instance of the object(s) of interest and indicating, for each bounding box, what the object is. The bounding box about the object (s) of interest may be referred to as a "tag." In alternative embodiments, the image may be annotated or otherwise reduced to a series of isolated or patterned vectors, the vectors of which comprise directional flow and are suggestive of an objective type associated with the object(s) of interest. These images may then be pre-loaded or transmitted to the AI model 204 residing on the application 201. Each of the AI engines 302*a-n* may comprise various neural networks having "weights," or other calculable emphases, prescribed to each of the tags or vectors associated with the object(s) of interest, such as the objects 311*a-n*. The output from the AI model 204, which may be received by the message broker message queue 202 in the form of an object detection message 212, or, in optional embodiments, a server having artificially intelligent modeling (as shown in FIG. 2) is compared to the pre-loaded or pre-learned tags or vectors, so as to contrast calculable differences, in two- and three-dimensions, of the object(s) of interest and archetypes of object types. Based upon these calculable comparisons between the pre-loaded or pre-learned tags or vectors, in conjunction with those tags or vectors mapped to the objects 311*a-n* of the captured image 310, one or more of the AI engines 302*a-n* may perform immaterial, or consequential, adjustments to the AI model 204, so as to correct, mitigate, or deviate from mis-learnings in previous iterations of training. Each round of training rounds, each of which may be referred to as an "epoch," are repeated in iterations of varying degrees of magnitude (e.g., hundreds, thousands, tens of thousands, etc.) in the expectation that the AI model 204 will at least marginally improve, and bolster in accuracy, as applied to object types of the objects 311*a-n*. FIG. 4 shows an embodiment of a captured image 400 containing a plurality of objects 401*a-n* of varying object types. An object detection message 212 is generated for each of these detected objects 401*a-n*, in the manner prescribed above.

Figure 5:
FIG. 5 illustrates an embodiment of a security image display within a system providing image-based facility security with a smart visual display according to the present disclosure.

FIG. 5 illustrates an exemplary embodiment of a security image display within a system providing image-based facility security with a smart visual display according to the present disclosure. A set of captured images 500 may be displayed to a monitoring user on a display of the monitoring user device 105. When the number of captured images begins to grow, a monitoring user may find monitoring all of the captured images challenging to avoid missing detection of a particular person or object in a location of the facility at any point in time. The present disclosure attempts to address these issues present in current systems.

Figure 6:
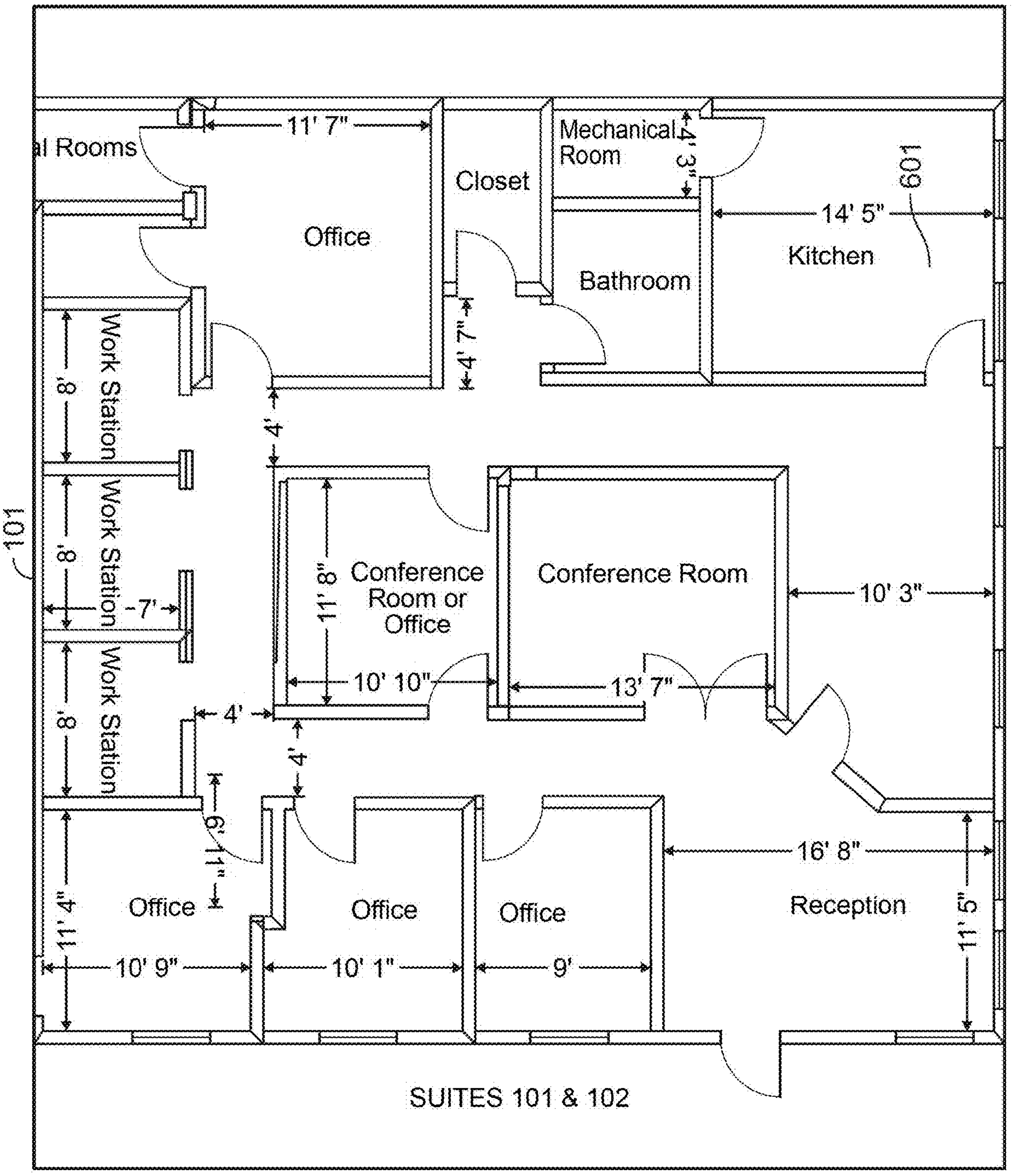
FIG. 6 illustrates an embodiment of a visual representation of a facility within a system providing image-based facility security with a smart visual display according to the present disclosure.
Figure 7:
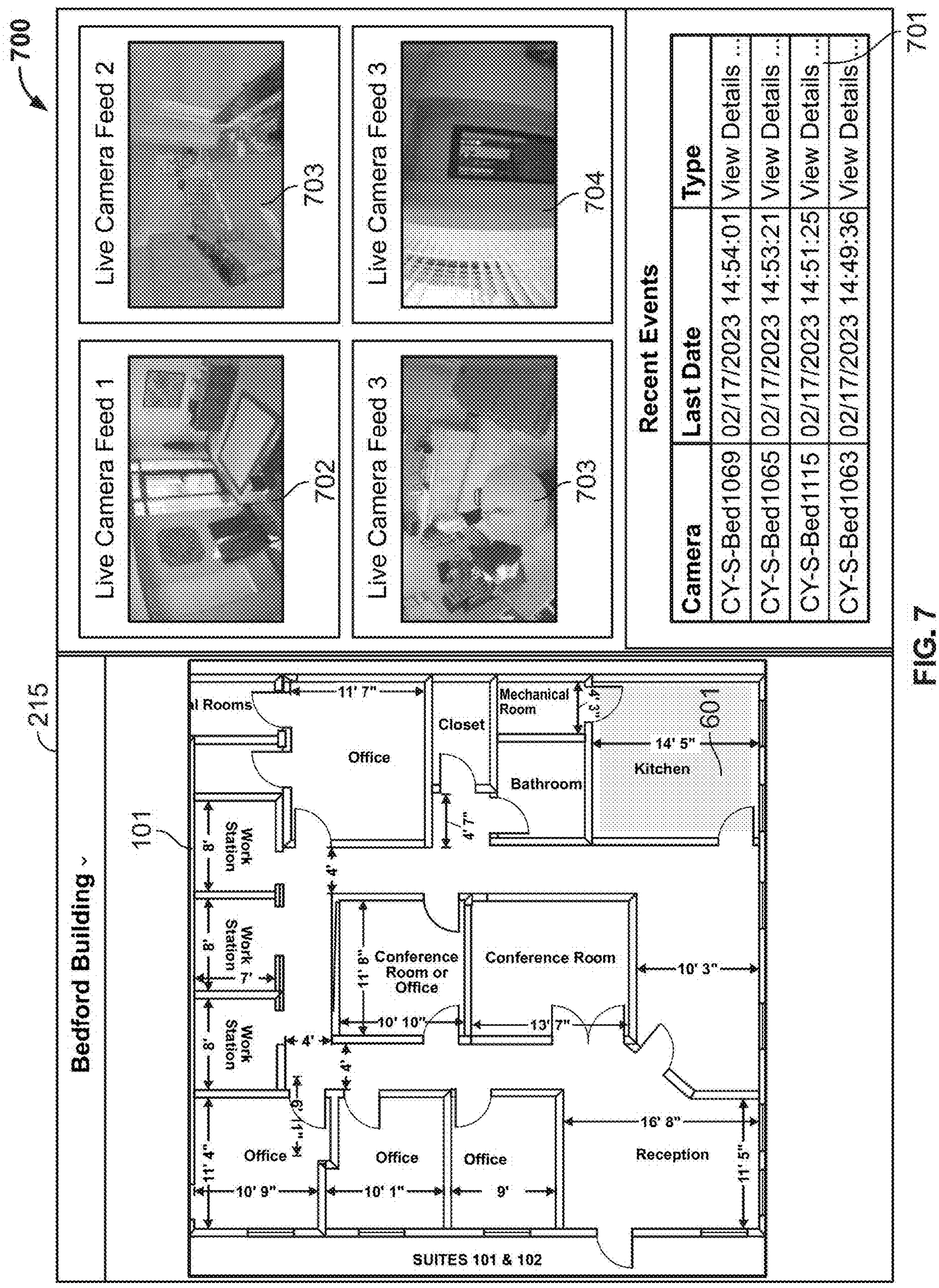
FIG. 7 illustrates an embodiment of a security image display for a facility provided by a computing system for image-based facility security with a smart visual display according to the present disclosure.
Figure 8:
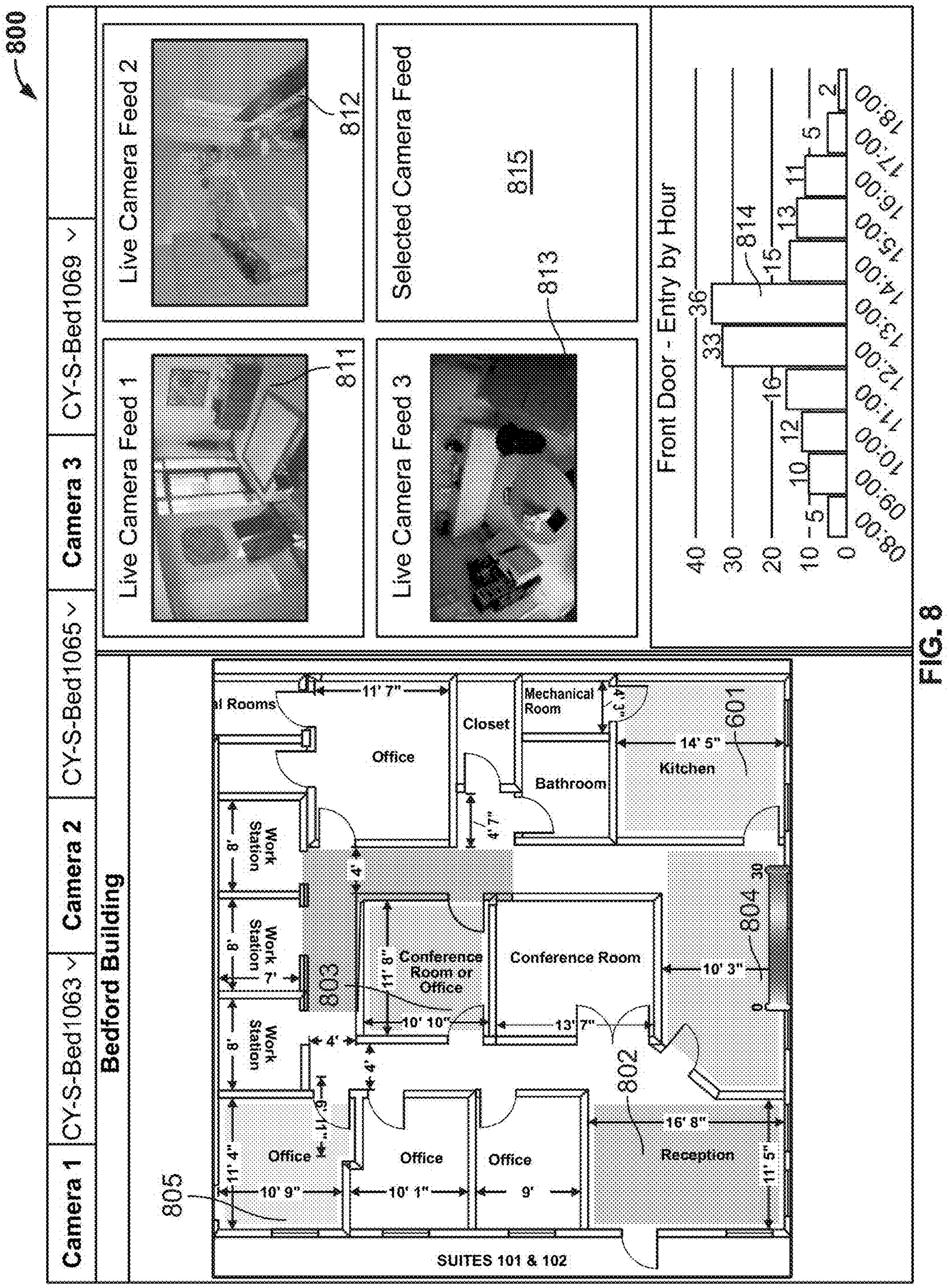
FIG. 8 illustrates another embodiment of a security image display for a facility provided by a computing system for image-based facility security with a smart visual display according to the present disclosure.

FIG. 6 illustrates an exemplary visual representation 600, or a blueprint 600, of a facility within the system providing image-based facility security 100 with a smart visual display according to the present disclosure. The facility depicted in FIG. 6 may comprise any type of facility, such as an educational institution, a shopping center, a residential habitation, or a commercial complex. FIGS. 7-8 illustrate embodiments of a facility dashboard 215 for a facility provided by a computing system providing the image-based facility security 100 with a smart visual display according to the present disclosure. Each of the embodiments 700, 800 of the facility dashboard 215 may use the embodiment of the blueprint 600, shown in FIG. 6, which may be viewable on a display of the monitoring user device 105.

FIG. 7 illustratively conveys a visual representation 101, or the blueprint 101, having a plurality of rooms, localities, and spaces that interconnect with each other that defines the layout of the facility. One room, e.g., a kitchen 601, is depicted in FIGS. 6-7. Each room, such as the kitchen 601, may be overlayed or backgrounded with varying colors, such as a red background, the color which may correspond to a detected person or object within a field-of-view of an image source 103*a-n*.

FIG. 8 shows another embodiment 800 for a facility dashboard 215 in which the kitchen 601 and an office 805 are highlighted in a certain color, such as the color yellow, with additional rooms and spaces displayed in other colors, such as red 802, green 803, and peach 804. Each of these different colors may indicate different conditions or objects detected in the digital images from the corresponding image sources 103*a-n* having fields-of-view in these rooms, localities, and spaces. For example, the colors in FIG. 8 may represent relative levels of occupancy. As shown just below the room having peach 804 coloration, a legend having a colorized spectrum, may indicate low- to high-level occupancy, and the legend may have a configurable slider, so that a user may adjust the slider for occupancy values (i.e., number of individuals present in each of the rooms, localities, or spaces, such as the kitchen 601 or the office 805).

The facility dashboard 215 shown in FIGS. 7-8 also shows current images from different image sources 103*a-n*. The images 702-704 may correspond to image sources 103*a*-c that have detected a recent event as determined by business logic rules. A list of the recent events 701 may be visually conveyed in the facility dashboard 215 of FIG. 7 with an entry identifying each of the recent events with an ID corresponding to the image source 103*a-n* in which the event was detected and a timestamp for the event occurrence. The entries also may include a link to additional details associated with the detected event. In one embodiment, these additional details may include the data from the object detection message 212 in which the event was detected and its corresponding digital image. The images 702-704 may correspond to a current or latest captured image 301 from the corresponding image source 103*a-c* that is periodically updated when subsequent digital images 301 are captured.

FIG. 8 shows additional data, such as trending data 221, as optionally outputted from the web host 206, or the analytics data 222, as optionally outputted from the rest API 207, for example, a count of entry of individuals through a front door to the facility visible in one particular captured digital image 811 of the image sources 103*a-c*. The analytics data 222 may be visually illustrated as analytics 814, in which the number of entries per hour is visually conveyed to a user. In other embodiments, additional data may show other trending data 221 and analytics data 222, for example, an occupancy of individuals in facility locations visible in captured digital images 812-813 of the image sources 103*a-n*. A monitoring user may request various data onto the facility dashboard 215 as needed. For example, in addition to the captured digital images 811-813, the monitoring user may select a desired one of the captured digital images from the plurality of image sources 103*a-n* to display as a selected camera feed 815.

Figure 9:
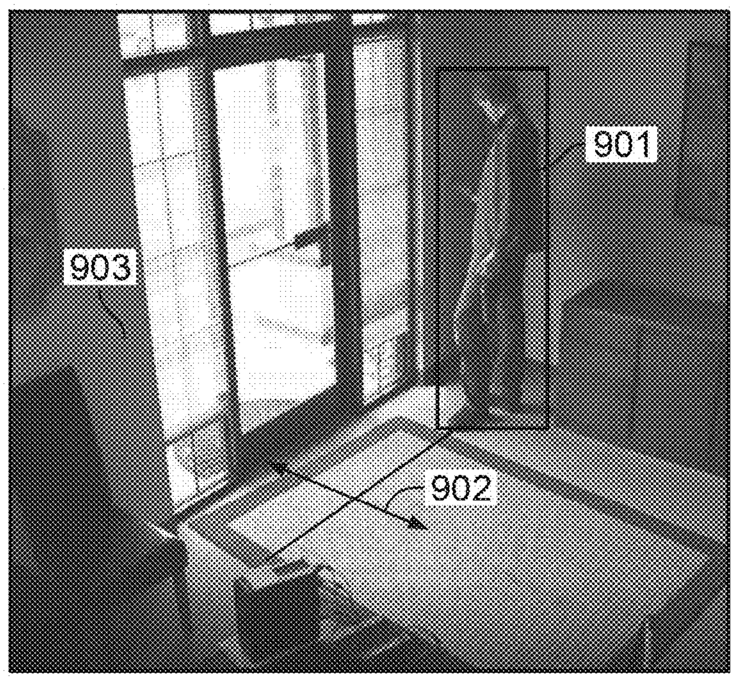
FIG. 9 illustrates an embodiment of an image identifying an individual about a facility entrance in a system providing image-based facility security with a smart visual display according to the present disclosure.

FIG. 9 illustrates an exemplary image identifying an individual 901 about a facility entrance 903 of a facility 900 in the system providing image-based facility security 100 with a smart visual display according to the present disclosure. The individual 901 is detected in a captured digital image 301 for the image source 103*a-n* having a field-of-view directed at the entrance 903. The business logic rules within the business logic rules engine 203 may determine when the individual 901 crosses an identified boundary 902 as he/she enters and exits the entrance 903. The business logic rules engine 203 may use object detection messages 212 from previously captured digital images 301 obtained from this particular image source 103*a-n* to determine when the individual 901 is seen crossing the identified boundary 902 when determining that the individual has entered or exited the facility. The business logic rules engine 203 may generate an event message that is dispatched to the message broker message queue 202 corresponding to the event of the individual entering or exiting the facility. The business logic rules engine 203 may include any number of business logic rules that detect similar events occurring within any captured digital image 301.

Figure 10:
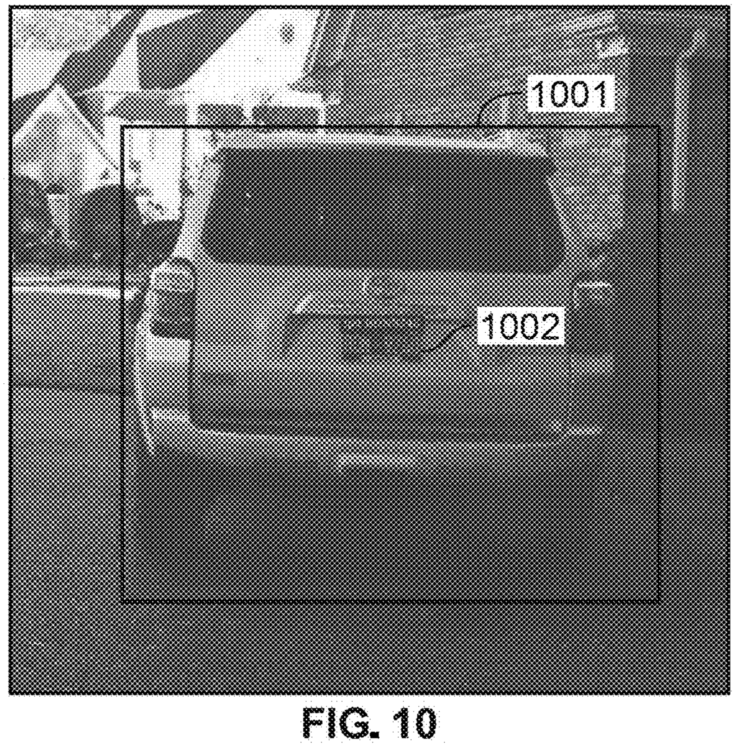
FIG. 10 illustrates an embodiment of an image of an identified vehicle having an identified license plate in a system providing image-based facility security with a smart visual display according to the present disclosure.

FIG. 10 illustrates an embodiment of an image of an identified vehicle 1001 having an identified license plate 1002 in the system providing image-based facility security 100 with a smart visual display according to the present disclosure. A captured digital image 301 is shown having multiple detected objects 1001-1002 in a facility 1000. One of the AI engines 302*i* may be trained to identify a vehicle 1001. The object detection message 212 for the detection of the vehicle 1001 may include various different object descriptors including a vehicle make and model, a vehicle year, a vehicle color, and similar identifying characteristics generated by a particular AI engine 302*i*, as applied to an object type corresponding to the vehicle.

Similarly, a vehicle license plate 1002 may be detected as the second object 1002. The object detection message 212 for the vehicle license plate 1002 may include object descriptors associated with the license plate such as color, state of issue, and license plate number or ID. The detection of these objects 1001-1002 may be used by business logic rules in the business logic rules engine 203 to identify a party expected to be in the vehicle when arriving at the facility. An example of the business logic rules for this example is disclosed in more detail in reference to FIGS. 12-13 and 15-16 herein.

Figure 11:
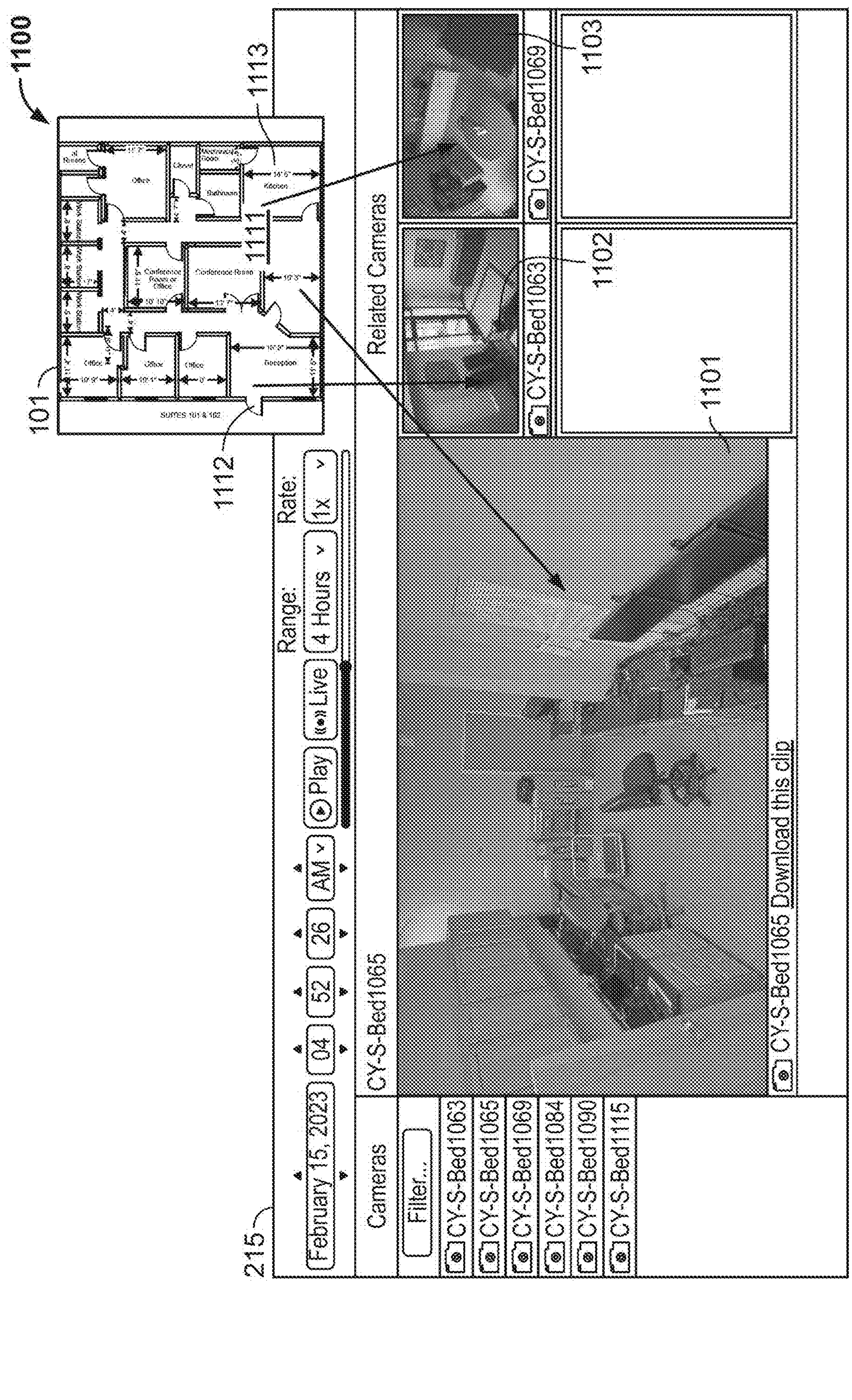
FIG. 11 illustrates an embodiment of a security display for a particular location of a facility provided by a computing system for image-based facility security with a smart visual display according to the present disclosure.

FIG. 11 illustrates an exemplary embodiment of a security display 1100 for a particular location of a facility provided by the computing system providing image-based facility security 100 with a smart visual display according to the present disclosure. Each of the image sources 103*a-c* in a facility generates images of physical space of the facility. Images captured from each of these image sources 103*a-c* include a unique ID corresponding to its corresponding image source 103*a-c*. When the facility security system 100 is configured, physical relationships between the fields-of-view for each captured digital image 301 are known such that adjacent fields-of-view are known. Where there are physical relationships between the fields-of-view for each captured digital image, an adjacent image source, whether as one or more of the image sources 103*a-c*, may comprise an image source having a field-of-view of the facility located at a location in which an object or person passing through a first field-of-view of an image source enters a field-of-view of the adjacent image source upon leaving the first field-of-view.

Using this information derived when the facility security system 100 is configured, a facility dashboard 215 may be defined that shows a captured digital image 301 selected for display on the facility dashboard 215 by a monitoring user may display a selected captured digital image 301 with one or more adjacent captured digital images 301. A blueprint 101 of the facility also may be displayed such that the monitoring user may observe the spatial relationship of the field-of-view 1111 corresponding to the selected captured digital image 301 as well as the corresponding fields-of-view 1112-1113 of the adjacent captured digital image 301. Optional embodiments for the facility dashboard 215 may be configured to present any number of captured digital images 301 arranged within the facility dashboard 215 that provides the monitoring user with an ability to see relevant areas of the facility in relation to a detected object or event present in the facility at a given point in time.

Figure 12:
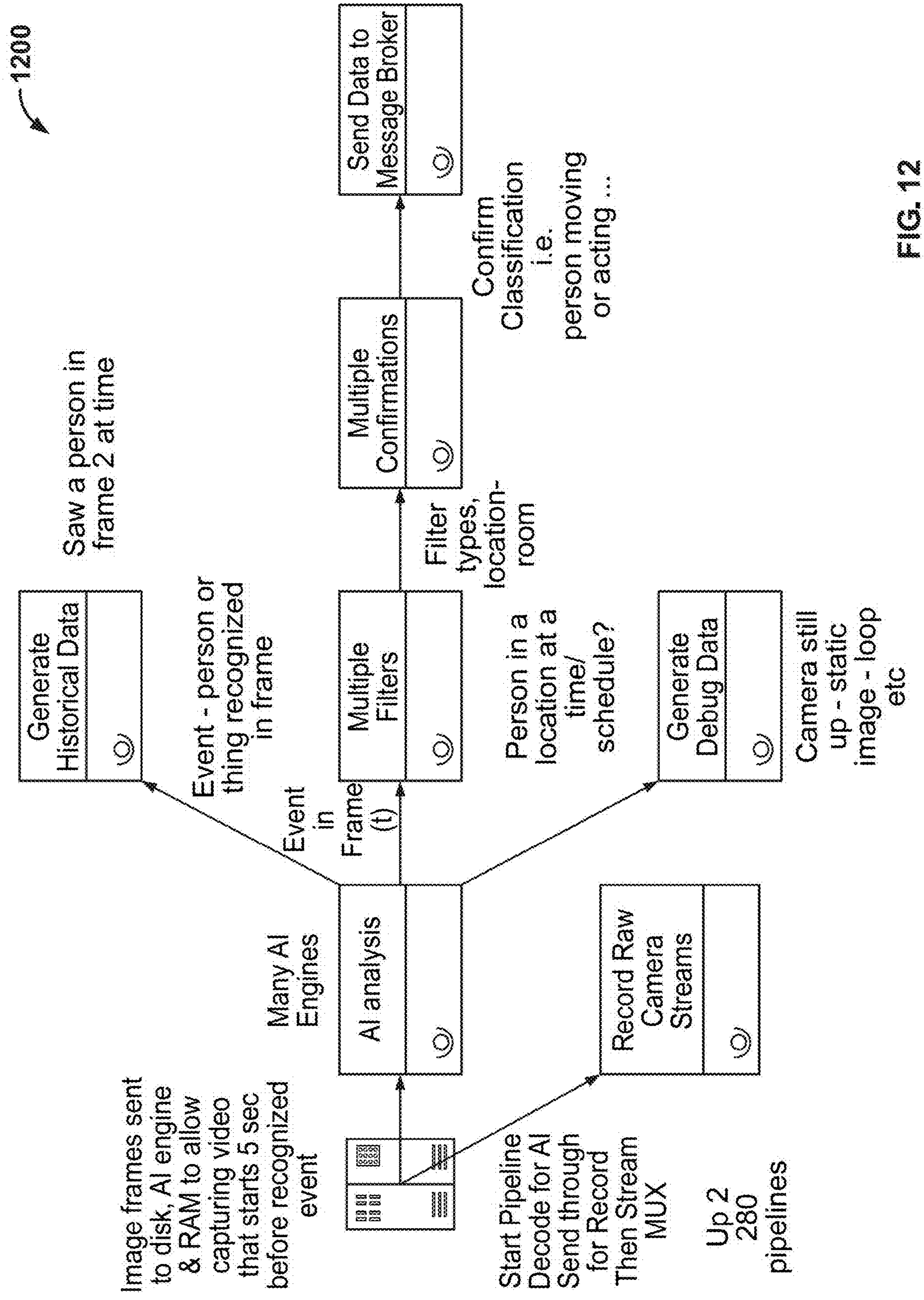
FIG. 12 illustrates a flow diagram of a data transfer or sharing mechanism for image-based facility security with a smart visual display according to the present disclosure.

FIG. 12 illustrates a flow diagram of a data transfer or sharing mechanism for image-based facility security 100 with a smart visual display according to the present disclosure. The flow diagram 1200 of FIG. 12 may depict operation of the AI model 204 of the application 201. As shown in FIG. 12, and as further explained with respect to FIG. 2, each of the AI engines 302*a-n* of the AI model 204 may receive a digital image 301 generated by an image source 103*i*. The frames of the digital image 301 may comprise a video file, or series of image files, in which a recognized event occurs with respect to the object 303; in other embodiments, the video file, or the series of image files, may encompass the recognized event occurrence with respect to the object 303, along with a recording of about five to ten seconds before and/or about five to ten seconds after the recognized event occurrence (though the recording may comprise a time greater or lesser than five to ten seconds before and/or after the recognized event occurrence). The AI engines 302*a-n* may commence with the training analysis, or series of epochs, as explained with reference to FIG. 2, and the digital image 301 generated by the image source 103*i* may optionally be recorded as raw camera streams.

As further discussed with reference to FIG. 2, each of the AI engines 302*a-n* may perform a series of epochs or trainings on the object 310, which may encompass the multiple objects 311*a-n* identified at various locations within the captured image 310. For each successive training, the AI engines 302*a-n* may perform a series of steps, including the generation of historical data (whether pre-loaded or captured from prior digital images 301), application of filters with respect to the object type of the object 303, and the generation of de-bug data, particularly in circumstances where the image source 103*a-c* experiences technical difficulty, such as a camera sway or degradation in resolution. In optional embodiments, historical data may comprise a collection of object descriptions maintained within a database, such as the database 210, that is searchable using one or more of the object descriptors. The historical data may include an object type, a location of the field-of-view covered by the corresponding image source, and the image timestamp. In other optional embodiments, the de-bug data may comprise data obtained from images sources useful in determining an operating status of image sources and corresponding communication channels to the system 100. After performing each of these steps, and as further explained with reference to FIG. 2, each of the AI engines 302*a-n* may execute a series of confirmations based on the trainings, so as to calculably determine the object type of the object, such as the object 310, and thereby to determine what actions (if any) the object 310 is taking, including menacing behaviors or the wielding of dangerous other objects 311*a-n*. Thereafter, the AI engine 204 generates the object detection message 212 for the message broker message queue 202, as further explained with respect to FIG. 2.

Figure 13:
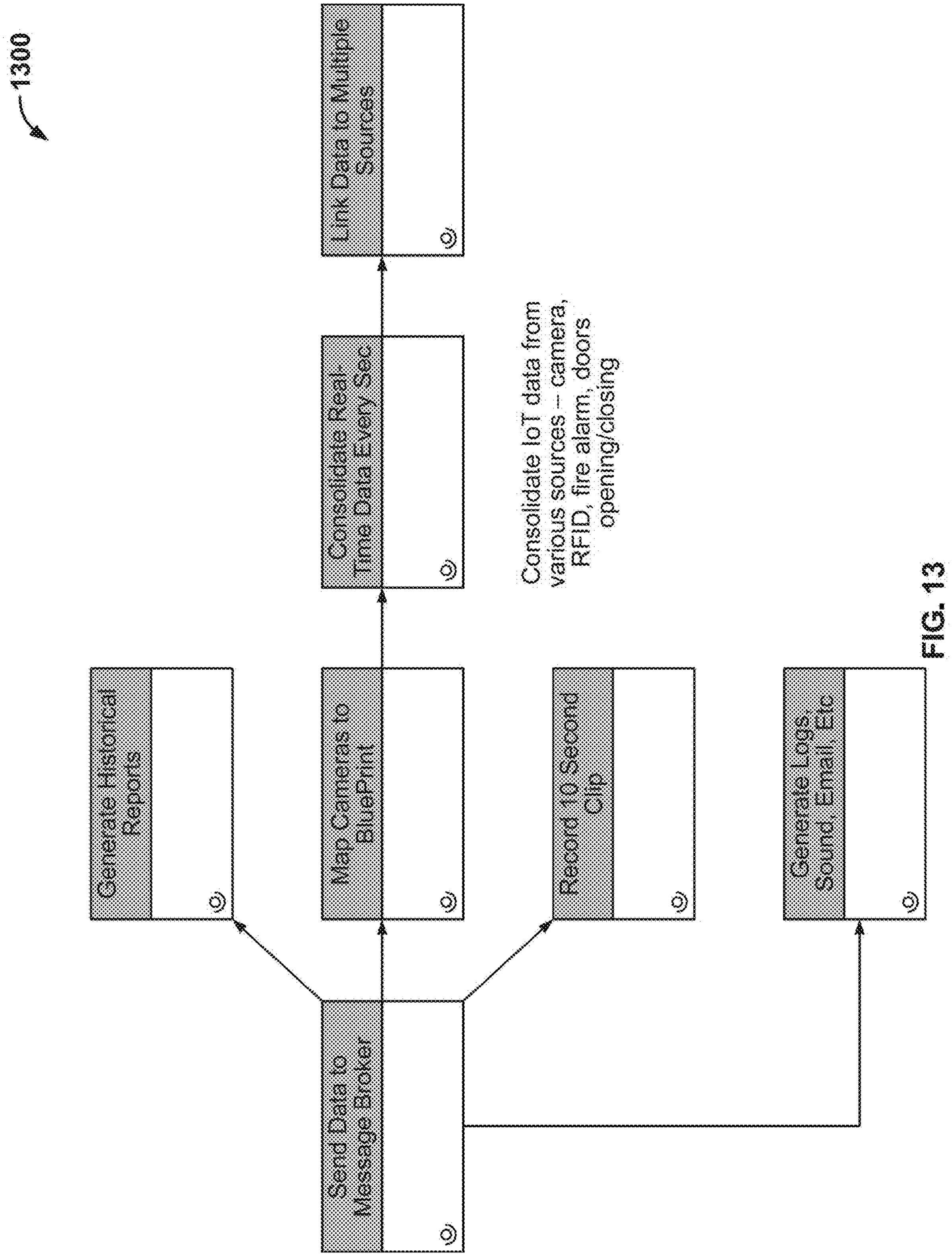
FIG. 13 illustrates a flow diagram of a linking of data transferred or shared by multiple sources for image-based facility security with a smart visual display according to the present disclosure.

FIG. 13 illustrates a flow diagram 1300 of business logic rules for identified objects within the system providing image-based facility security 100 with a smart visual display according to the present disclosure. As shown in FIG. 13, the message broker message queue 202 may generate historical reports based upon the historical data referenced in FIG. 12, the reports of which may be transmitted to the data logger 205, and onto the database 210 of the system 200. For each digital image 301 generated by the image source 103*i*, certain parameters are applied with said digital image 301, including a length or duration of recording for such digital image 301 (e.g., ten seconds). After receiving the object detection message 212 from the message broker message queue 202, the business logical rules engine 203 may apply business logic rules to the digital image 301, in combination with other digital images 301 received from various image sources 103*a-n*. In other words, the business logic rules engine 203 may receive data, such as data over the Internet of Things (IoT), from the image sources 103*a-n*, and in optional embodiments, the business logic rules engine 203 may receive data from other data sources, including external sensor data 224, alarm notifications (e.g., fire-alarm notification), door sensors for opening and/or closing, radio frequency identifiers (RFIDs), and other sensors that may be implemented in certain key rooms, spaces, or localities on the facility. The data from the image sources 103*a-n* may correspond to fields-of-view 121*a-n*, enabling a mapping of one or more of the digital image 301 across the blueprint 101. To effectuate a fulsome blueprint 101 of the facility, the data from the image sources 103*a-n* and the other data sources (e.g., external sensor data 224) may be consolidated, on a real-time basis. By employing extract-transform-load (ETL) logic (and as further explained with reference to FIG. 2), each of the consolidated data sets may be linked across the varying sources, including image sources 103*a-n*.

Figure 14:
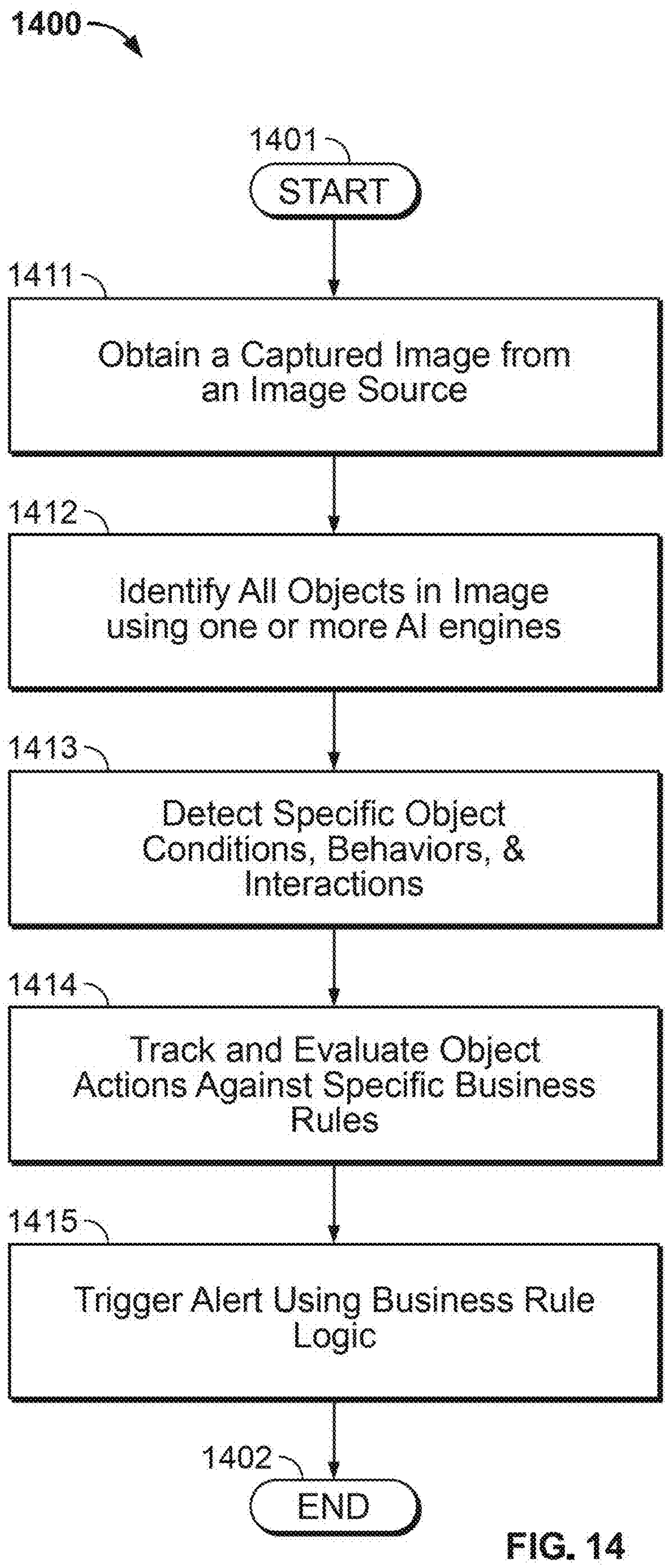
FIG. 14 illustrates a flowchart of processing operations triggering an alarm in a computing system of software providing image-based facility security with a smart visual display according to the present disclosure.

FIG. 14 illustrates a flowchart of an embodiment for processing operations that trigger an alarm in the computing system of software providing image-based facility security 100 with a smart visual display according to the present disclosure. The process 1400 begins 1401 when a captured digital image 301 is obtained from an image source 103*a-n* in step 1411. The captured digital image 301 is processed in the AI model 204 to identify all objects detected in the captured digital image 301 in step 1412, such as objects 311*a-n*. An object detection message 212 is generated for each object identified in step 1412.

In step 1413, the object detection messages 212 are processed in the business logic rules engine 203 to track and evaluate the detected objects using the business logic rules contained therein, as in step 1414. Alarms to monitoring users also may be triggered by one or more business logic rules within the business logic rules engine 203 that are output for receipt by one or more monitoring user, as in step 1415. These alerts may include visual indications displayed on the facility dashboard 215, email and SMS messages sent to particular monitoring users, auditory signals sent to the monitoring users in the facility, and auditory signals sent to remote monitoring users via smartphones and similar remote devices depending upon the particular alert being generated. Each of these alerts is configured when the facility security system 100 is installed in the facility based upon the unique needs of a particular facility. The business logic rules in the business logic rules engine 203 may be configured to provide any number of different alerts depending upon the object and event that is detected.

Figure 15:
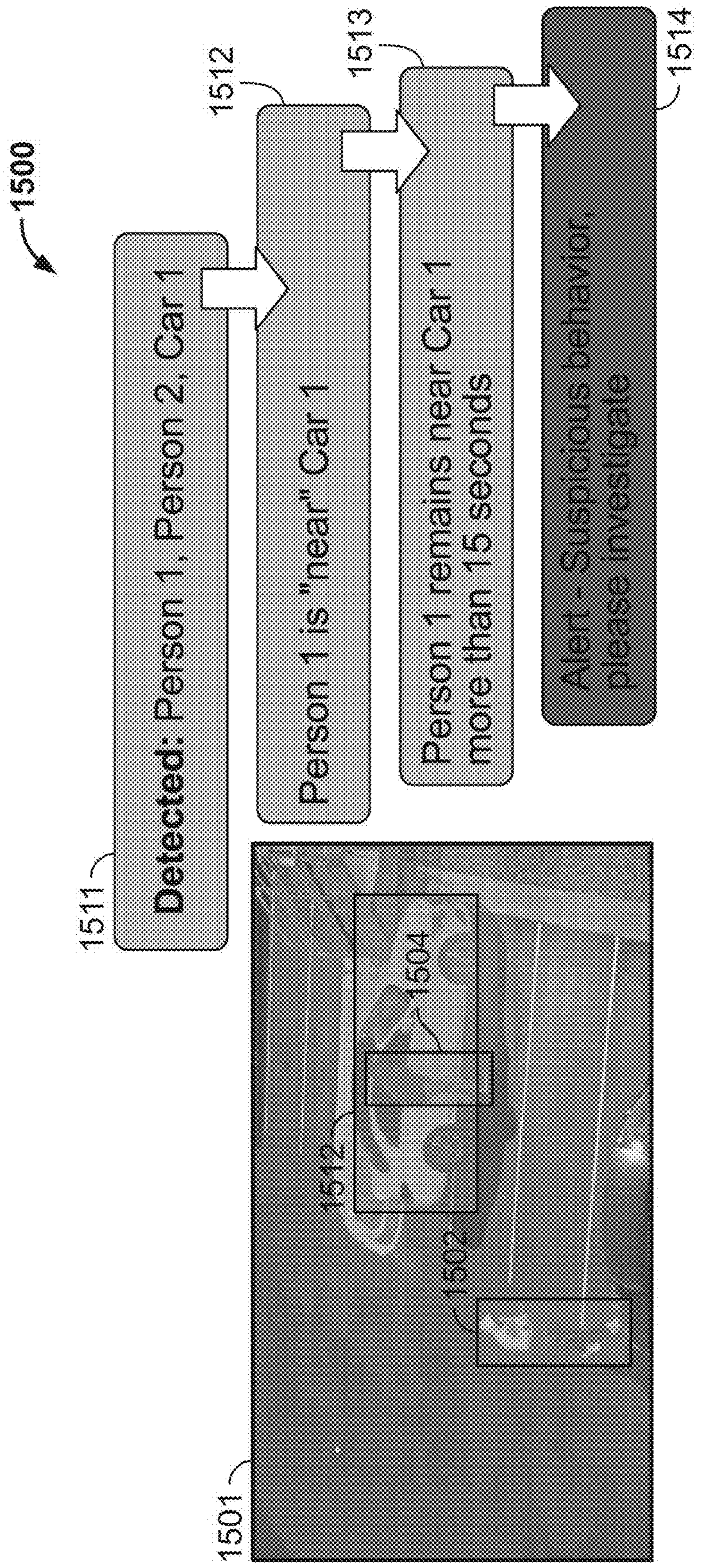
FIG. 15 illustrates an embodiment of business logic rules for identified objects within a system providing image-based facility security with a smart visual display according to the present disclosure.

FIG. 15 illustrates an embodiment 1500 of business logic rules for identified objects within the system providing image-based facility security 100 with a smart visual display according to the present disclosure. A captured digital image 1501 is processed in the one or more AI engines 302*a-n* and three objects 1502-1504 are detected. An object detection message 212 is generated for each detected object: person 1 1504, person 2 1502, and car 1 1503. These object detection messages 212 are processed by a series of business logic rules 1511-1514 within the business logic rules engine 203. The first rule 1511 determines if there are objects in a captured digital image 1501 having objects classified having an object type of one or more persons and an object type of a car. When this first rule 1511 is determined to be true, a second rule 1512 is applied and determines if one of the objects identified as a person 1502, 1504 is near an object identified as a car 1503. When the second rule 1512 is determined to be true, a third rule 1513 is applied and determines if one of the objects identified as a person 1504 previously determined to be near an object identified as a car 1503 has been near the car 1503 for greater than a specified time period, for example 15 seconds. When the third rule 1513 is determined to be true, an alarm 1514 is triggered to alert a monitoring user to investigate what may be observed in a captured digital image 1501 and its corresponding image source 103*a-n*.

The business logic rules may be configured to define the presence of any object having a known object type as specified in its object detection message 212, a location, a time specified in a format corresponding to the timestamp for the captured digital image 1501 specified in its object detection message 212, and any combination of the other object descriptors in the object detection messages 212. The business logic rules may include any number of different if/then determinations that are logically combined.

Figure 16:
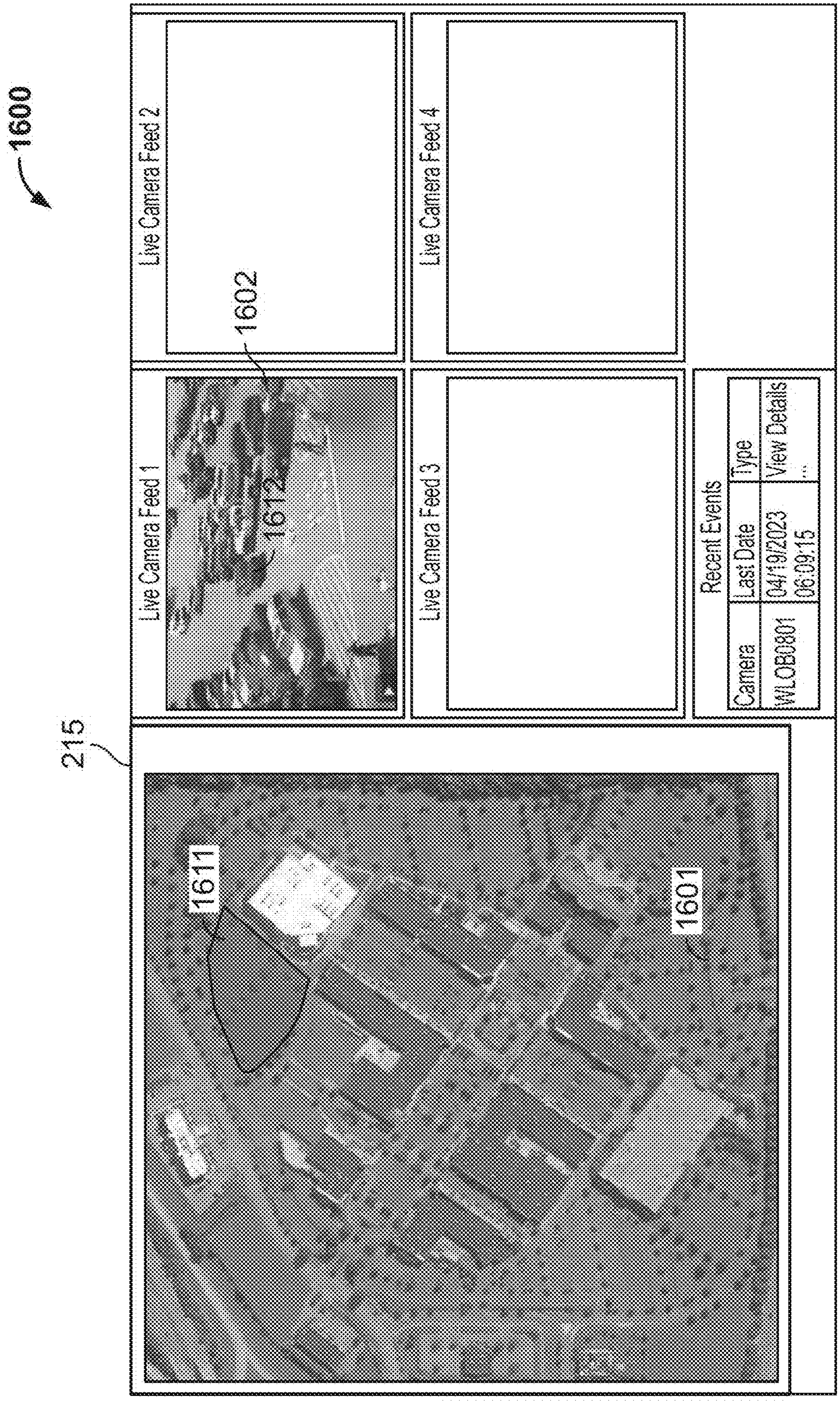
FIG. 16 illustrates an embodiment of a security display for a parking lot location of a facility provided by a computing system for image-based facility security with a smart visual display according to the present disclosure.

FIG. 16 illustrates an embodiment of a security display 1600 for a parking lot location of a facility provided by the computing system for image-based facility security 100 with a smart blueprint visual according to the present disclosure. FIG. 16 shows a facility dashboard 215 having a blueprint 1601 in a form of a representation of parking areas about a facility. One or more image sources 103*a-n* may be directed to cover various locations within the parking areas. The embodiment of the facility dashboard 215 shows one captured digital image 1602 from an area in the captured digital image 1601. In this example, a vehicle 1612 is detected within the field-of-view of the image source 103*a-c* for the captured digital image 1602. The business logic rules engine 203 may determine whether the vehicle 1602 is moving or is stationary and if moving, is travelling in a predictable or erratic path, and generates an alert in the form of highlighting an area 1611 of the captured digital image 1601, such as in the color red, on the facility dashboard 215. The alert may provide a current captured digital image 1602 of the area to allow a monitoring user to observe the vehicle 1612 as it moves through the parking areas. The area 1611 of the captured digital image 1601, which may be highlighted in the color red, may be presented as a non-regularly arranged boundary with the business logic rules engine 203 using business logic rules to determine the position of the vehicle 1612 as it moves in subsequent captured digital images 1602 in an erratic path.

Figure 17:
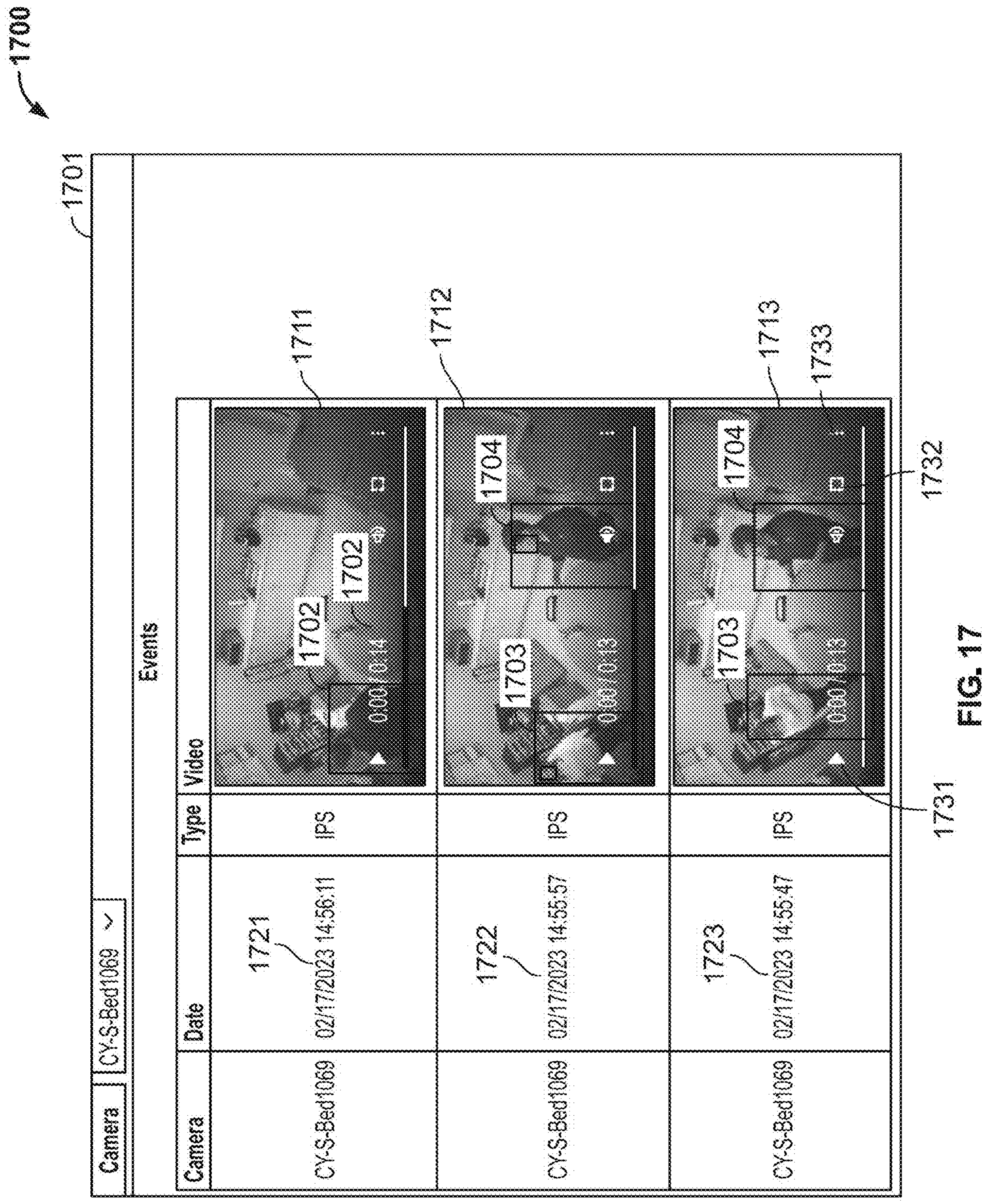
FIG. 17 illustrates an embodiment of a user interface search screen for identified objects within a system providing image-based facility security with a smart visual display according to the present disclosure.

FIG. 17 illustrates an embodiment of a user interface search screen 1700 for identified objects within the system providing image-based facility security 100 with a smart blueprint display according to the present disclosure. The facility security system 100 may present monitoring users with displays monitoring user devices 105 having information in addition to and/or in place of a facility dashboard 215 with one or more captured digital images 301. FIG. 17 shows results from a search for objects detected in images from image sources 103*a-c* that meet criteria defined within a search query.

A search query may be submitted to the database 210 with a query for objects specified within saved object detection messages 212. Database entries of object detection messages 212 may be retrieved and presented to a monitoring user for review. Object descriptors including an ID for an image source 103*a-n* and a timestamp found within every object detection message 212 may be used to retrieve a captured digital image 301 corresponding to the object specified in the object detection message 212 returned in response to the search query.

FIG. 17 shows a plurality of results from the use of a search query that present the timestamps 1721-1723 for the objects and the captured digital images 1711-1713 in which one or more objects 1702-1704 are detected. The search result display 1701 also may provide a first monitoring user controls 1731-1733 to play a ten second image sequence clip for one of the captured digital images 1711-1713. A second monitoring user control 1732 on each captured digital images 1711-1713 may cause a selected captured digital image 1711-1713 to be displayed to the monitoring user on the search results display 1701 in a full screen and/or full resolution if desired. The search result display 1701 may contain other replay control mechanisms that allow the monitoring user to review an image sequence clip to efficiently determine what if anything needs attention and to review the image sequence clip during a later investigation into an event occurrence. Other embodiments for the search result display 1701 may be configured using the object detection message 212 returned in response to the search query. An image sequence clip may comprise a series of sequential digital images from a particular image source, such as image sources 103*a-n*, about a point in time in which an object, such as an object 303, is detected within one or more of the digital images 301. Typically, the sequential digital images within the image sequence clip start a defined amount of time before the particular point in time through a defined end point in time after the particular point in time. For example, and as discussed with reference to FIG. 12, a 10 second image sequence clip may be the series of sequential digital images starting 5 seconds before an occurrence of an event confirmation that continues for 5 seconds after the occurrence of an event confirmation. The total length of time for the image sequence clip and the starting point in time and the ending point in time for the image sequence clip may vary relative to the event confirmation point in time.

Figure 18:
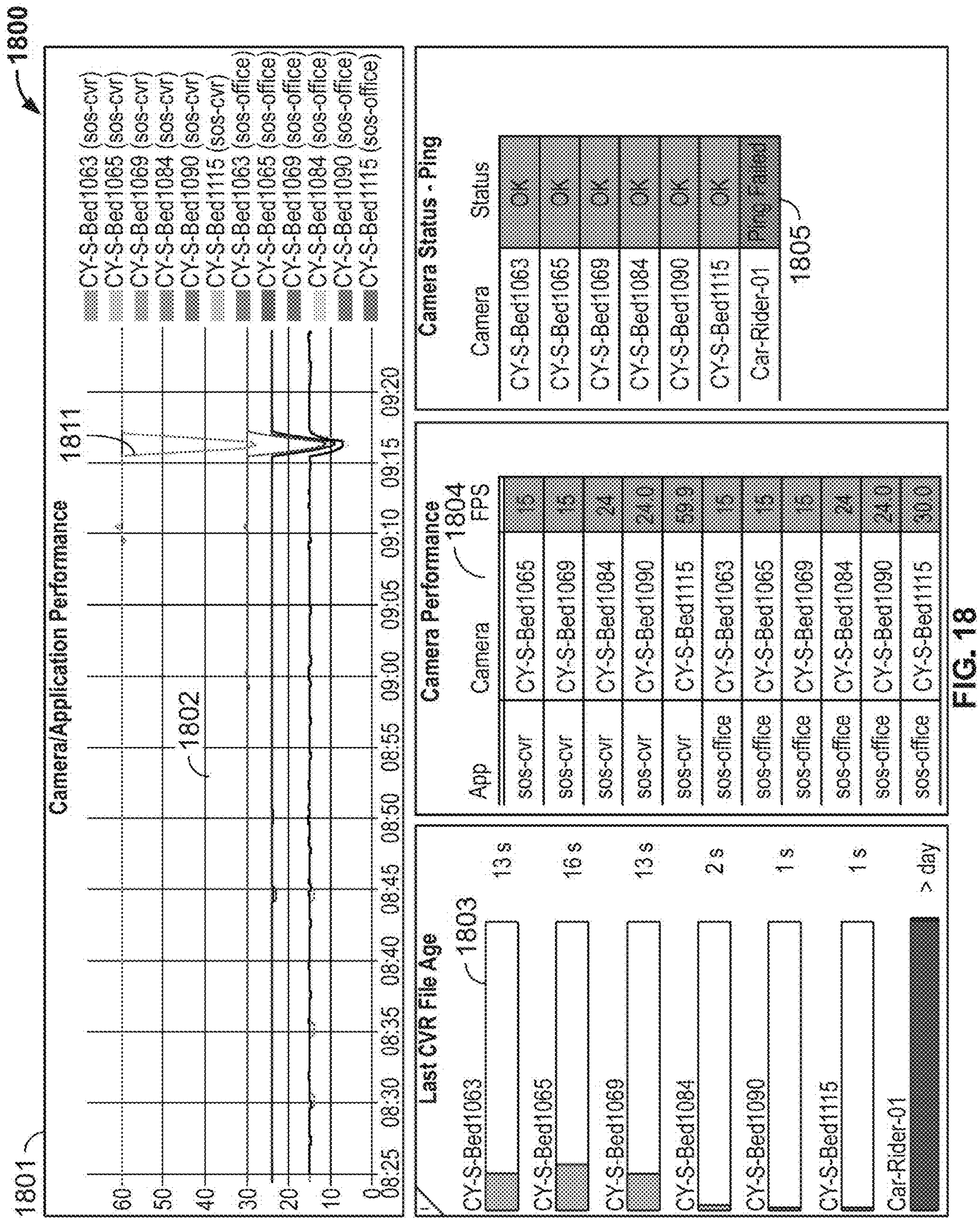
FIG. 18 illustrates an embodiment of a system operations screen within a system providing image-based facility security with a smart visual display according to the present disclosure.

FIG. 18 illustrates a system operations screen 1800 within the system providing image-based facility security 100 with a smart blueprint visual according to the present disclosure. The facility security system 100 utilizes a plurality of image sources 103*a-n* that are periodically generating a number of captured digital images 301 to detect objects and events in need of responses to alerts. In order to provide 24/7 security monitoring, the security server 110 monitors the operating condition of the image sources 103*a-n* to detect when a failure or technical issue arises that may also need attention.

FIG. 18 shows a system health display of the systems operation screen 1800 that uses a device health screen 1801 to display data related to the operating conditions of the image sources 103*a-n* and related components, including the application health monitor 211. The device health screen 1801 may include a timeline 1802 of captured digital images 301 from each of the image sources 103*a-n* in the facility security system 100. The timeline 1802 may present a number of captured digital images 301 received from each of the image sources 103*a-c* every minute over a period of time. This timeline 1802 may illustrate the occurrence of a systemwide event 1811, such as a network communications error or a power disruption if the timeline 1802 shows the count of captured digital images 301 received from all of the image sources 103*a-n* drop at the same time for a similar length in time. This event 1811 may provide a timestamp in which a monitoring user may review the captured digital images 301 from the image sources 103*a-n* both before and after the timestamp to investigate whether the event 1811 is in response to a detected person of object viewable in the captured digital images 301.

The device health screen 1801 may also present related data including the age of the last received captured digital image 1803 from a particular one or more image sources 103*a-n*. These ages for the last captured digital image 301 from each image source 103*a-n* may be separately displayed along with other performance data 1804 including an ID for the image source 103*a-n*, a description of the location for the field-of-view, and an average number of captured digital images 301 received in a defined period of time. This age 1803 and performance 1804 data may provide valuable insight into current operating status of the facility security system 100.

Lastly, the device health screen 1801 may display network status 1805 for each of the image sources 103*a-n* that may be obtained by the security server 110 transmitting a network ping signal to each image source 103*a-n* on a periodic basis to confirm communication conductivity between the security server 110 and the image sources 103*a-n*. Other performance metrics may be included in a device health screen 1801 that are readily available to the facility security system 100 and its security server 110.

Figure 19:
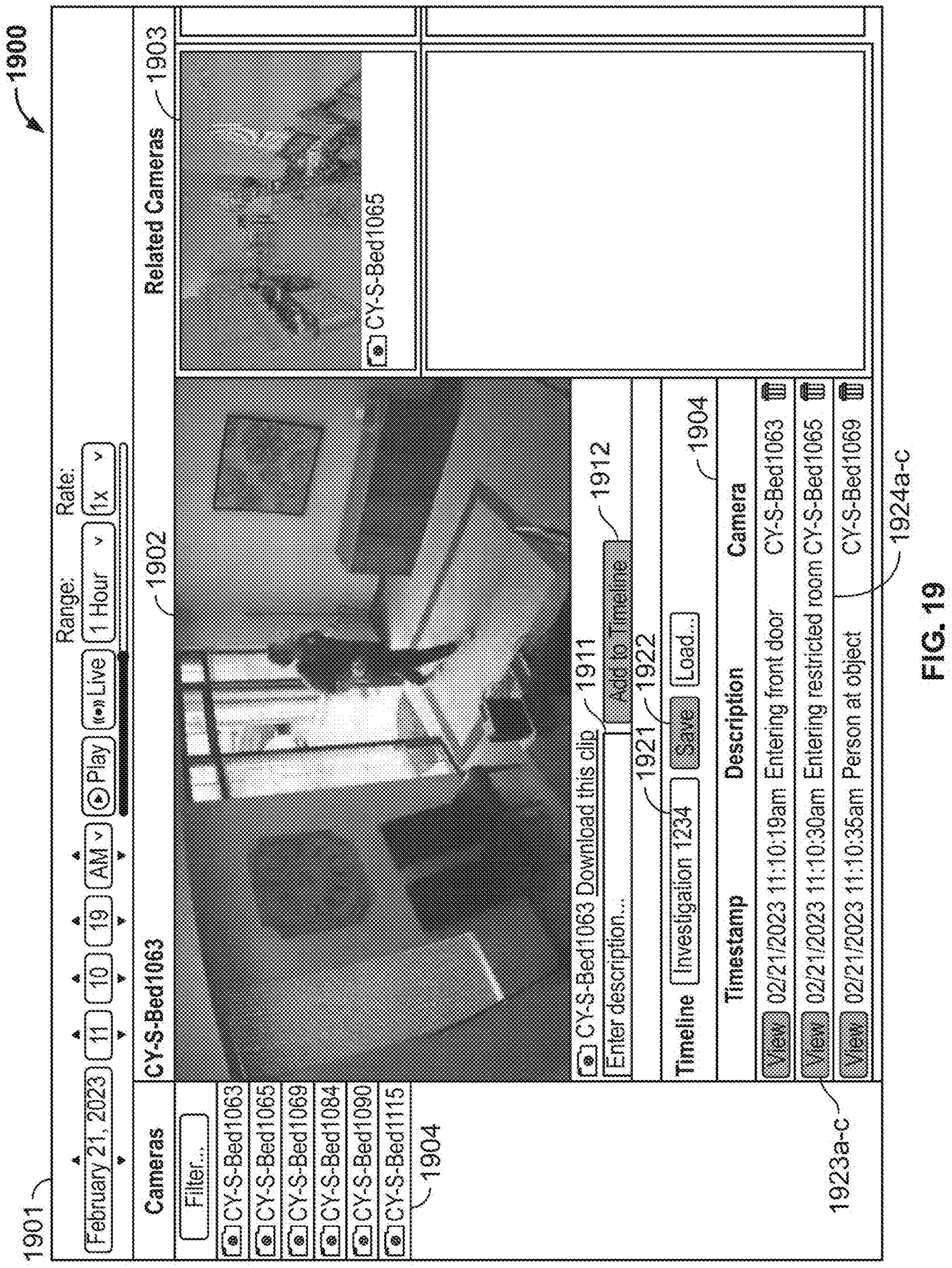
FIG. 19 illustrates an embodiment of an image sequence playback screen for identified objects within a system providing image-based facility security with a smart visual display according to the present disclosure.

FIG. 19 illustrates an exemplary embodiment 1900 image sequence playback screen 1901 for identified objects within the system providing image-based facility security 100 with a smart visual display according to the present disclosure. The playback screen 1901 may convey the captured digital image 1902, adjacent of which is a captured digital image 1903 of a varying field of view from a different image source 103*a-n*. The play back screen 1901 may have several user controls 1911-1912, 1921-1922, and 1923*a*-1924*c*. For example, user control 1912 may enable a user to add a particular image sequence clip to a "timeline," and such image sequence clip may be searched through the search bar 1911. In addition, user control 1921 may allow a user to label the aforementioned timeline, enabling the user to save (under user control 1922), share, and later archive the timeline, such as by and through the database 210. User controls 1923*a-c* may thereby enable a user to review the image sequence clips archived to the timeline, each of which bear a corresponding timeline descriptor 1924*a-c*.

Figure 20:
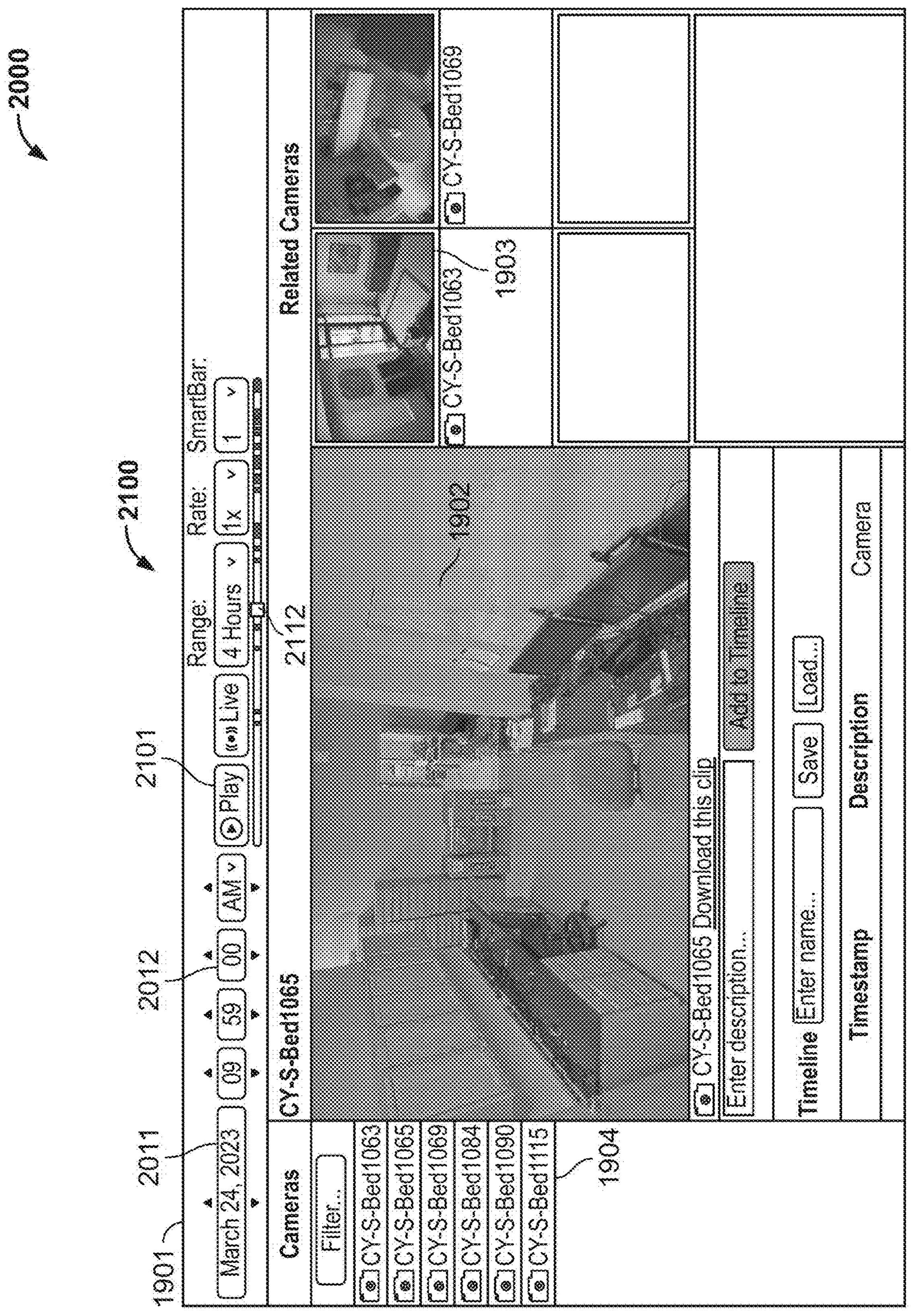
FIG. 20 illustrates an embodiment of a historical image search screen for identified objects within a system providing image-based facility security with a smart visual display according to the present disclosure.

FIG. 20 shows an exemplary embodiment of an image sequence control 2000 having an image sequence playback screen 1901 to illustrate additional monitoring user controls 2101-2103, 2011-2012, 2101, and 2112 present on the image sequence playback screen 1901. The monitoring user controls 2101-2103, 2011-2012, 2101, and 2112 include a control that displays a date and time in which a captured digital image 1902 shown on the image sequence playback screen 1901 is displaying. The monitoring user may use these date and time controls 2011-2012 to move to other times in the captured digital images 1902. The playback controls may further include a playback/pause control 2101 to start and stop playback of an image sequence clip or sequence of captured digital images 1902, and a live view control 2112 to switch the displayed captured digital image 1902 from a recorded image to a current image defined by the latest captured digital image 301 received from the image source 103*a-n*. The displayed captured digital image 1902 may be controlled by selecting an image source identification 1904 from a list of available image sources 103*a-n*.

The image sequence playback screen 1901 also may include a playback control panel 2100, also referred to as a "SmartBar" 2100, that illustrates a timeline of objects and events detected from the sequence of captured digital images 301 available about a point in time currently being displayed. A more detailed presentation and description of the playback control panel 2100 is disclosed in reference to FIG. 21 herein.

Figure 21:
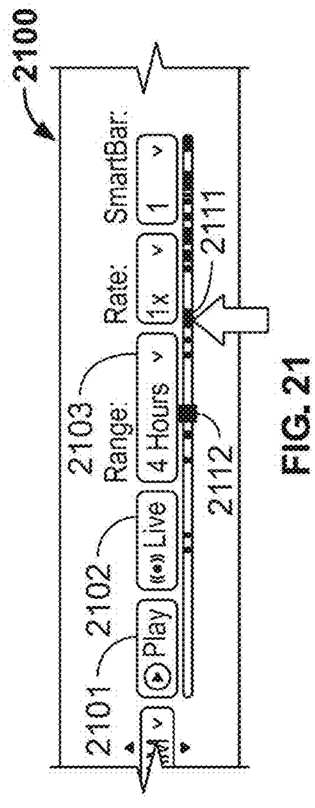
FIG. 21 illustrates an embodiment of a playback control panel within a system providing image-based facility security with a smart visual display according to the present disclosure.

FIG. 21 illustrates an exemplary embodiment of the playback control panel 2100 within the system providing image-based facility security 100 with a smart visual display according to the present disclosure. The playback control panel 2100 maps indexed data 2111 to indicate where, in a timeline, certain objects of interest may be viewed. A user may be able to adjust certain search parameters, including a number of objects (or object types) captured by image sources 103*a-n*, or as otherwise depicted in the digital image 301. The control panel 2100 may convey certain analytics, such as the indexed data 2111, to enable a user to navigate, by way of a slider control 2112, to a point in time 2103. Such point in time 2103 may be configured to show different ranges of time, whether it be five (5) minutes, one (1) hour, four (4) hours, etc. User control 2101 may enable a user to enable image sequence playback for the selected point in time 2103, and user control 2102 may allow a user to view a live feed from the selected image source 103*a-n*, notwithstanding the user's access of the playback control panel 2100.

Figure 22:
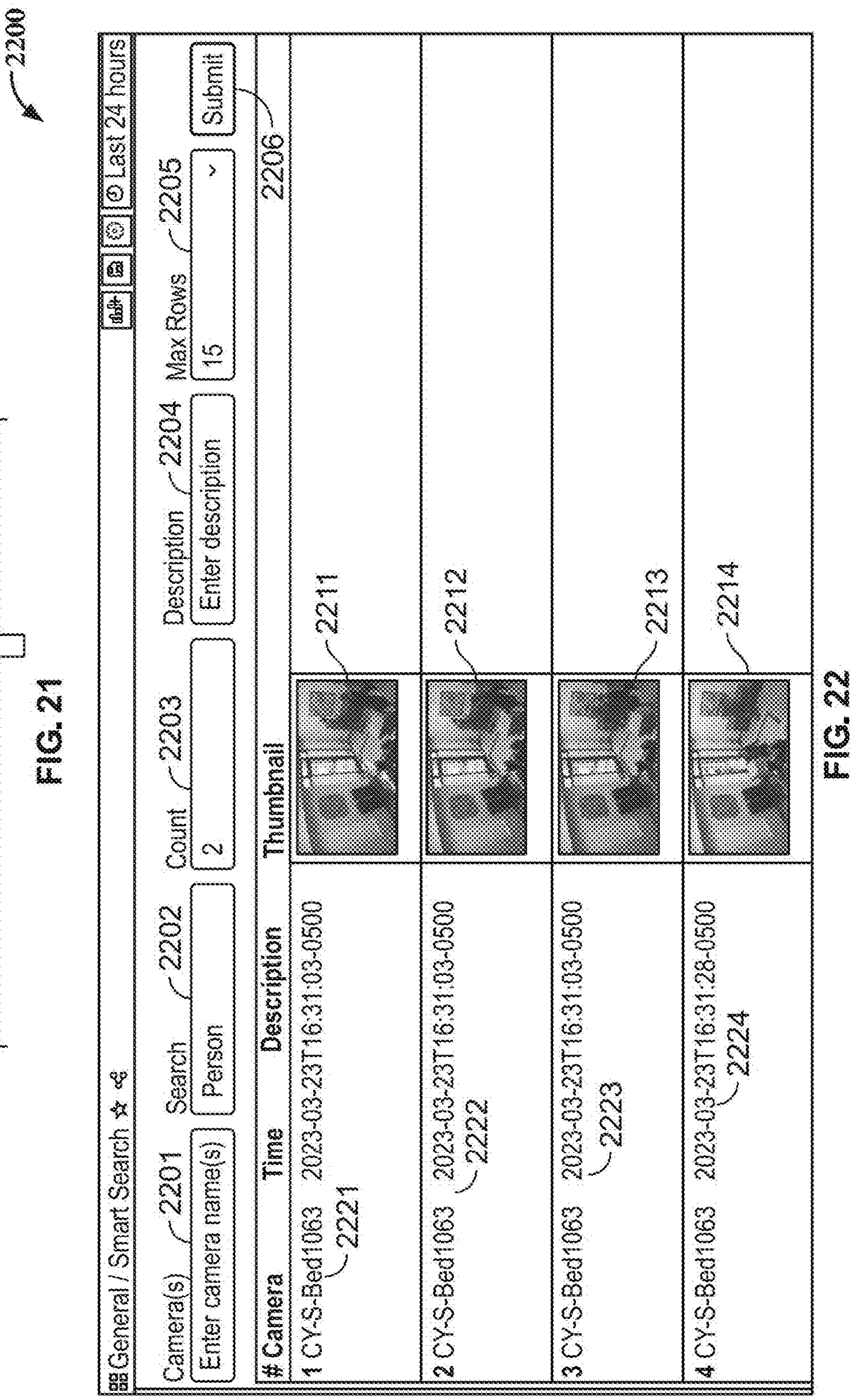
FIG. 22 illustrates an embodiment of a search control panel within a system providing image-based facility security with a smart visual display according to the present disclosure.

FIG. 22 illustrates an exemplary embodiment of search control panel 2200 within the system providing image-based facility security 100 with a smart visual display according to the present disclosure. In the exemplary embodiment of the search control panel 2200, a search query may be entered into a set of input fields 2201-2205 to specify the terms to be matched when processing the search query. These input fields include an image source ID 2201, a detected object type 2202, a number of similar objects of the object type to be detected 2203, a text description field 2204, and a maximum number of responses to the search query to be displayed at one time 2205. An input control 2206 submits the search query for application against the database 210 of object detection messages 212.

In the exemplary embodiment of FIG. 22, the image source ID 2201 and text description field 2204 are empty and are not used as part of the search query. The object type 2202 is set to a person and a count is set to a value of two (2) to define the search query to search for all objects that contain two (2) persons detected in a captured digital image 301. The object type 2202 corresponds to object types detected by the AI model 204 for use in the facility security system 100.

The search in the search control panel 2200 returns results including a plurality of object detection messages 212 found in the database 210. These results include both a thumbnail image 2211-2214 for the captured digital image 301 and the timestamp 2221-2224 corresponding to the object detection messages 212 identified by the search query. A monitoring user may select one of the thumbnail images 2211-2214 or one of the timestamps 2221-2224 to display an image sequence clip about the detection of the object specified in the corresponding object detection message 212 similar to a display illustrated in FIGS. 19-20 herein.

Figure 23:
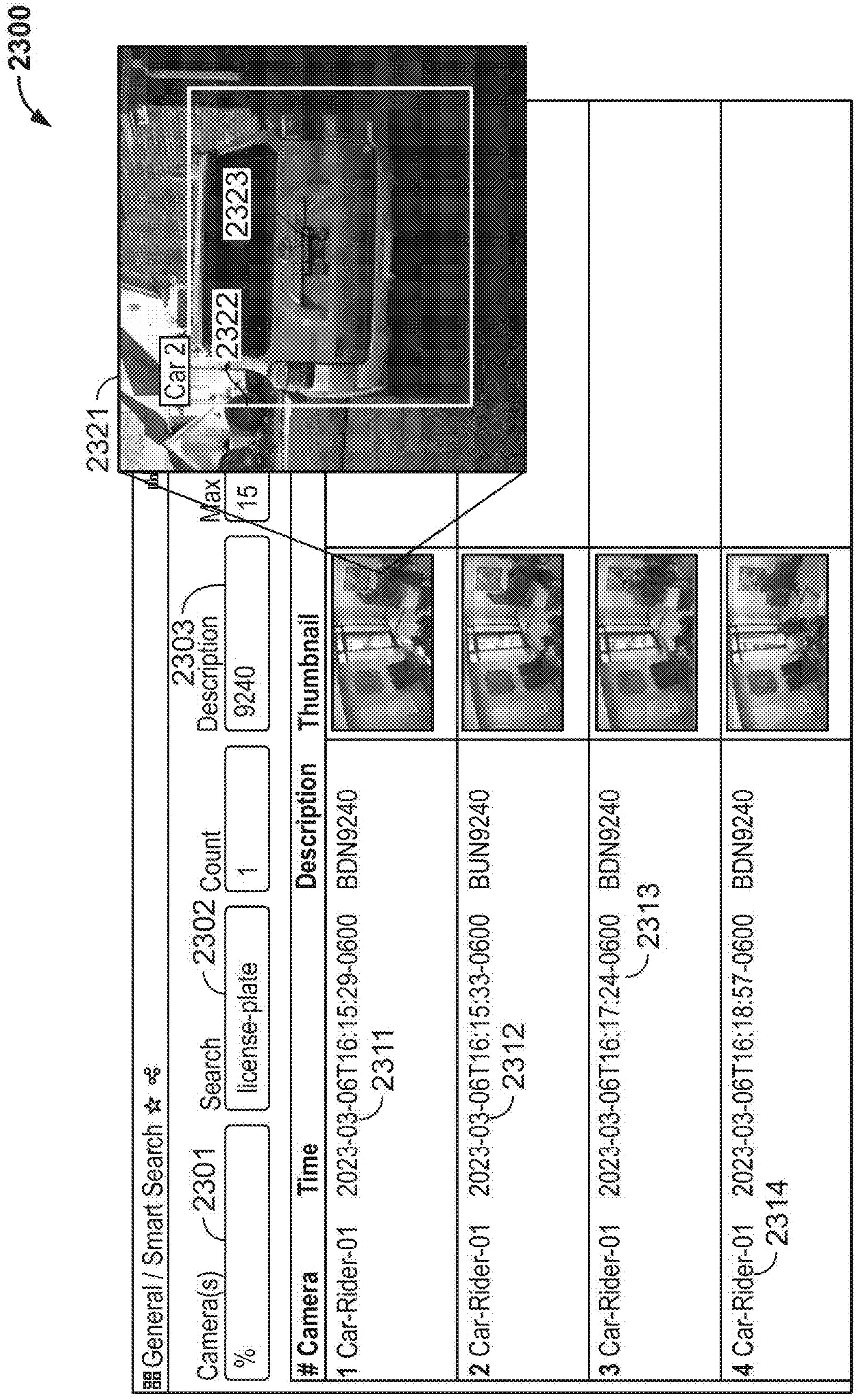
FIG. 23 illustrates an example embodiment of a car rider pickup business rule application within a system providing image-based facility security with a smart visual display according to the present disclosure.

FIG. 23 illustrates an exemplary embodiment of a search query result 2300 of a license plate number of a license plate 2323 within the system providing image-based facility security 100 with a smart visual display according to the present disclosure. As described above in reference to FIG. 10, one type of object may correspond to the license plate 2323 visible on a vehicle 2322 in a captured digital image 2321. In the search query 2301-2303 submitted to generate the search query results 2300, the monitoring user uses an object type 2302 of the license plate 2323 and a text description containing a text value of 9240.

As disclosed above, the AI engines 302*a-c* detecting license plate objects in captured digital images 2321 may detect numbers that are displayed on the license plate 2323. These numbers may be specified within the object descriptors of the object type for the license plate 2323. The search query 2201-2203 searches the database 210 to find all of the objects that contain a license plate having the numbers 9240. In other search queries, additional object descriptors including the state of issue for the license plate 2323, the vehicle 2322 make and model, and other relevant data may be specified to narrow a search for a particular known vehicle as part of an investigation into a past event. Using these search queries may permit monitoring users to find occurrences of objects of interest in all of the captured digital images 301 from all of the image sources 103*a-n* over a specified time period as part of an investigation into the occurrence of a past event.

Figure 24:
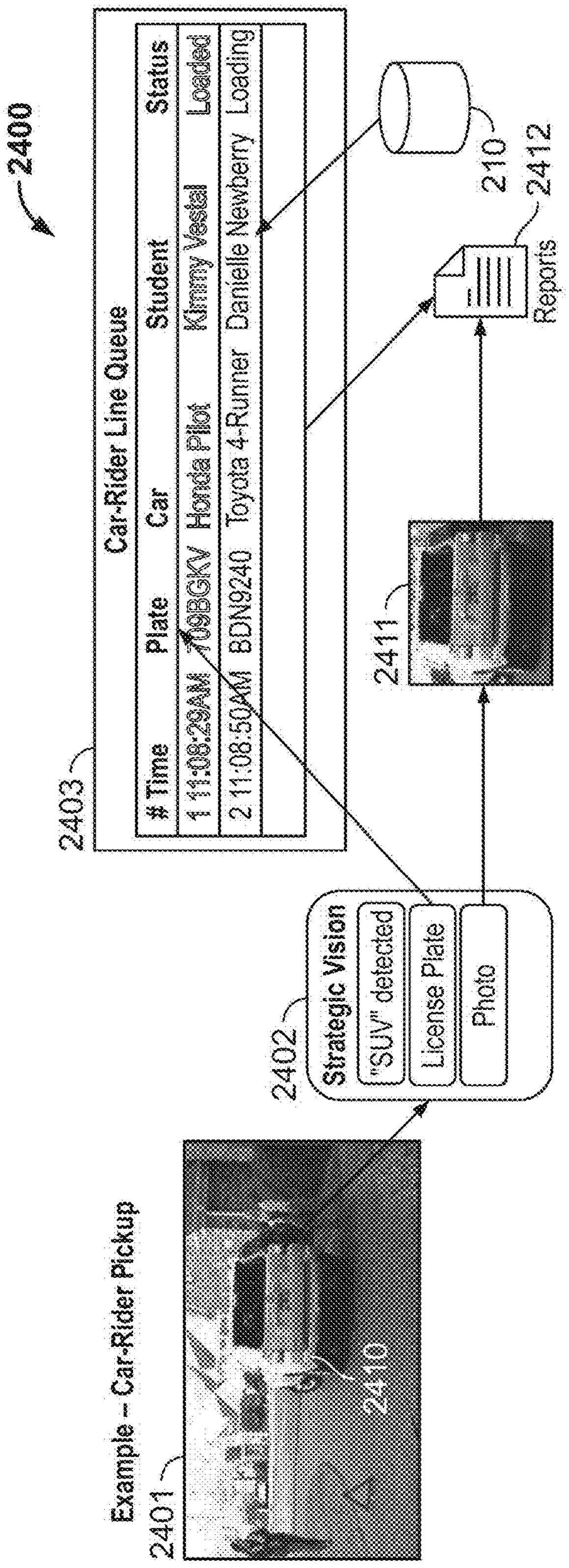
FIG. 24 illustrates an embodiment of a parking lot monitoring business rule application within a system providing image-based facility security with a smart visual display according to the present disclosure.

FIG. 24 illustrates an application of business logic rules to an embodiment of a car rider pickup line 2400, within a system providing image-based facility security with a smart blueprint visual according to the present disclosure. The example of FIG. 24 begins with a captured digital image 2401 of a vehicle 2410 having a license plate that is detected and read as described herein. The business logic rules engine 203 may use a set of business logic rules 2402 that detects an SUV with a license plate having a readable number. The business logic rules engine 203 also may utilize additional information including prior captured digital images 301, corresponding object detection messages 212, and driver data from reports and other sources 2412 stored within the database 210.

For example, a car-rider pickup line 2400 may be viewed by an image source 103*a-n* viewing a line of vehicles entering a parking area and driving to an entrance of a school facility to pick up one or more students. The parents of the students may provide information regarding the make and model of a vehicle 2410 and its license plate number to the school before regularly arriving to pick up their student. An image source 103*a-n* may utilize a field-of-view that views the vehicles as they arrive and await their turn at the front of the line to pick up the students.

While the vehicle waits in a line of vehicles heading toward a pickup location at the school facility, the facility security system 100 may visually identify a digital image 2411 of the vehicle 2410 within the captured digital image 2401, identity the make and model of the vehicle, determine the corresponding license plate number, and search the database 210 to determine whether a vehicle of the detected make and model has a license plate number that was detected. If there is a match, the business logic rules may retrieve the expected identity of the driver as well as the identity of the students to be picked up, the identity of which may be mapped from the application of the business logic rules 2402 in conjunction with the car-rider line queue 2403 comprising the identified vehicle 2410 of the captured digital image 2401. The business logic rules may then transmit an alert to a teacher or staff member associated with the identified students that their ride is in line for a pickup. The student may then be directed to exit the school facility to meet the vehicle when it progresses to the front of the line of vehicles avoiding a congregation of students awaiting pick-up. The identity of the driver and student may also be sent in an alert via an SMS message to a staff person positioned at the pickup location. Using this information, the staff person may confirm that the vehicle is driven by an authorized driver permitted to pick up the corresponding students.

The business logic rules may also be configured to send an alert when the vehicle and license plate number detected in the captured digital image 2401 do not match an entry in the database 210, as accessed from the car-rider line queue 2403. A second alert may be sent to the staff member identifying the vehicle with the detected license plate number that the staff member should interrogate to confirm their identity and relationship to a student. A third alert may be sent to multiple staff members if a known license plate number is detected on a vehicle with a make and model that does not match the vehicle identity retrieved from the database 210. In the latter example, staff members may investigate whether the driver is using a particular license plate not associated with or assigned to someone permitted to pick up a student. Additional business logic rules may be used to prevent a first parent from picking up a student after the other parent has provided the school with evidence of a domestic judicial order prohibiting the first parent from picking up the student. The facility security system 100 may utilize many different business logic rules based upon detectable data from the captured digital image 2401 along with additional data entered into the database 210.

Figure 25:
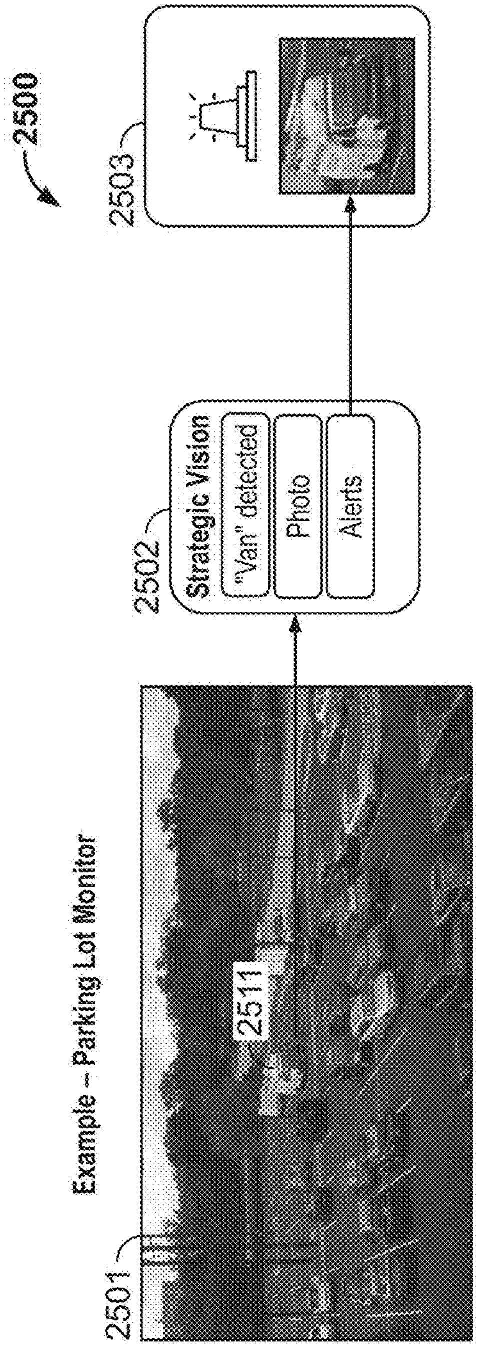
FIG. 25 illustrates an example embodiment of license plate number monitoring business rule application within a system providing image-based facility security with a smart visual display according to the present disclosure.

FIG. 25 illustrates an exemplary embodiment of a parking lot monitoring business rule application 2500 within the system providing image-based facility security 100 with a smart visual display according to the present disclosure. In the application 2500, the use of the facility security system 100 is to monitor vehicles in parking areas about the facility. A particular type of vehicle 2511 may be detected in a captured digital image 2501 that is identified by one or more business logic rules 2502 of a situation that may need unexpected or unscheduled intervention, including an alert 2503 to relevant authorities (e.g., police and/or fire department, or onsite security). In this example, the vehicle 2511 is a van of a type prohibited from the parking areas about the facility. In a similar example, the vehicle 2511 may correspond to a first responding vehicle such as an ambulance, fire truck, and police vehicle in which authorities in the school facility are to be informed by the alert 2503 generated by the facility security system 100 of the vehicle's 2511 arrival enabling timely action on the part of the school officials responsible for such events. Similar alerts are for scheduled arrival of a delivery vehicle to the responsible parties to meet the delivery vehicle to take possession of the item being delivered.

The facility security system 100 may also maintain the object detection messages 212 from all of the objects detected in captured digital images 301 along with the corresponding captured digital images 301 in the database 210. The data in the database 210 may be searched to determine details of events that occurred that are in need of further investigation. The object detection message 212 and corresponding captured digital images 301 may be removed from the database 210 after a defined period of time to reduce processing requirements when searches of the database 210 are performed. The object detection messages 212 and corresponding captured digital images 301 also may be archived for retrieval for longer periods of time in alternate data storage if searches and investigations are necessary of events detected by the security server 110 from the image sources 103*a-n*. The facility security system 100 may be configured to implement these processes unique to a particular facility as needed.

Figure 26:
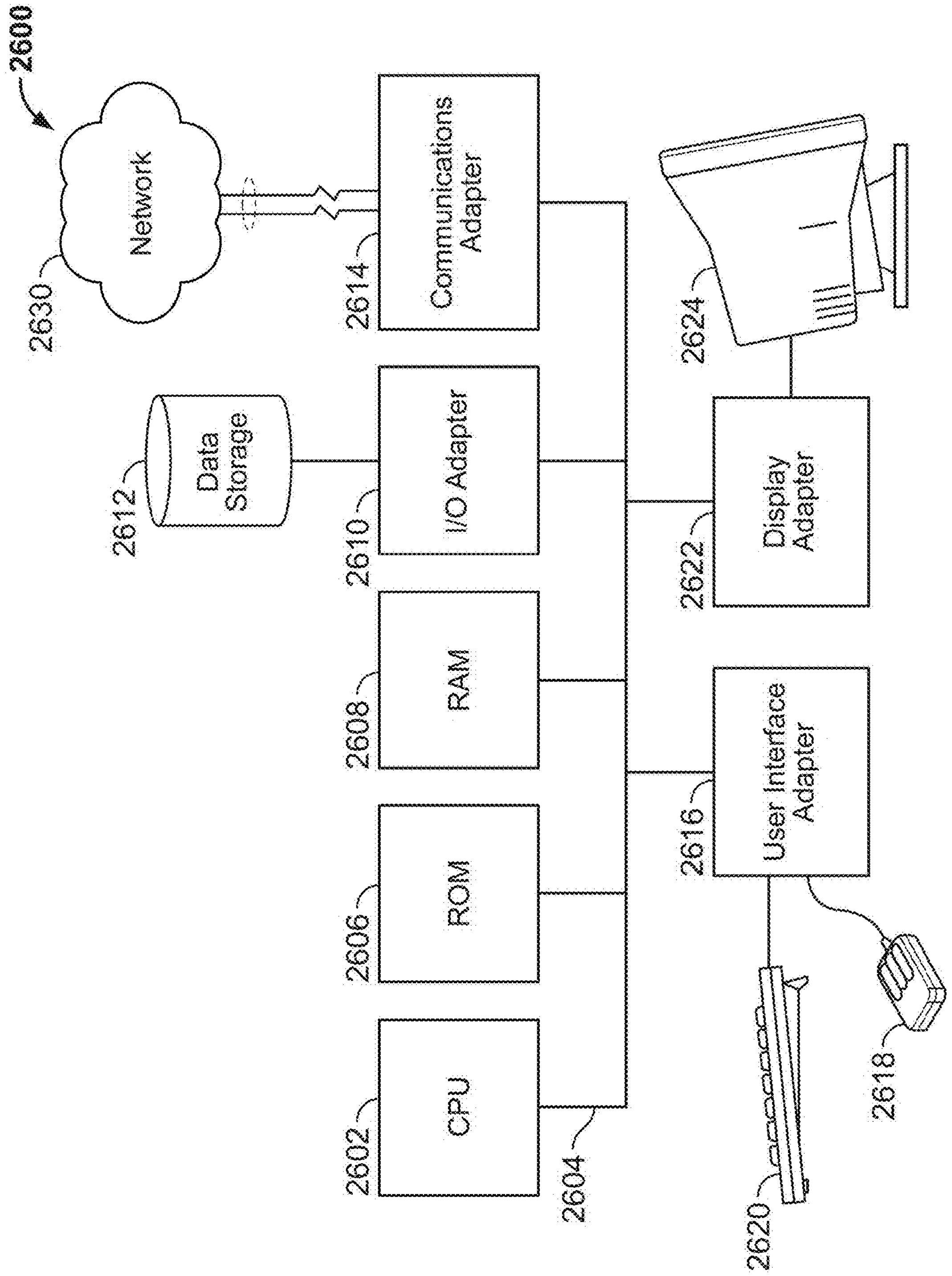
FIG. 26 illustrates a generalized schematic of a programmable processing system utilized as the various computing components described herein to implement an embodiment of the present disclosure.

FIG. 26 illustrates a generalized schematic of a programmable digital security processing system 2600 utilized as the various computing components described herein used to implement an embodiment of the present invention. The security processing system 110 may be implemented as the digital processing system 2600 that contains software in the form of executable instructions stored within memory of the security processing system 110. When the CPU 2602 executes these instructions in memory, the security processing system 110 performs the functions of the system 100 as described herein.

The CPU 2602 is coupled to the system bus 2604. The CPU 2602 may be a general-purpose CPU or microprocessor, graphics processing unit ("GPU"), and/or microcontroller. The present embodiments are not restricted by the architecture of the CPU 2602 so long as the CPU 2602, whether directly or indirectly, supports the operations as described herein. The CPU 2602 may execute the various logical instructions according to the present embodiments.

The computer system 2600 also may include random access memory (RAM) 2608, which may be synchronous RAM (SRAM), dynamic RAM (DRAM), synchronous dynamic RAM (SDRAM), or the like. The computer system 2600 may utilize RAM 2608 to store the various data structures used by a software application. The computer system 2600 may also include read only memory (ROM) 2606 which may be PROM, EPROM, EEPROM, optical storage, or the like. The ROM 2606 may store configuration information for booting the computer system 2600. The RAM 2608 and the ROM 2606 hold user and system data, and both the RAM 2608 and the ROM 2606 may be randomly accessed.

The computer system 2600 also may include an input/output (I/O) adapter 2610, a communications adapter 2614, a user interface adapter 2616, and a display adapter 2622. The I/O adapter 2610 and/or the user interface adapter 2616 may, in certain embodiments, enable a user to interact with the system 2600. In a further embodiment, the display adapter 2622 may display a graphical user interface (GUI) associated with a software or web-based application on a display device 2624, such as a monitor or touch screen.

The I/O adapter 2610 may couple one or more storage devices 2612, such as one or more of a hard drive, a solid-state storage device, a flash drive, a compact disc (CD) drive, a floppy disk drive, and a tape drive, to the computer system 2600. According to one embodiment, the data storage 2612 may be a separate server coupled to the computer system 2600 through a network connection to the I/O adapter 2610. The communications adapter 2614 may be adapted to couple the computer system 2600 to the network 2630, which may be one or more of a LAN, WAN, and/or the Internet. The communications adapter 2614 may also be adapted to couple the computer system 2600 to other networks such as a global positioning system (GPS) or a Bluetooth network. The user interface adapter 2616 couples user input devices, such as a keyboard 2620, a pointing device 2618, and/or a touch screen (not shown) to the computer system 2600. The keyboard 2620 may be an on-screen keyboard displayed on a touch panel. Additional devices (not shown) such as a camera, microphone, video camera, accelerometer, compass, and or gyroscope may be coupled to the user interface adapter 2616. The display adapter 2622 may be driven by the CPU 2602 to control the display on the display device 2624. Any of the devices 2602-2622 may be physical and/or logical.

The applications of the present disclosure are not limited to the architecture of a computer system 2600. Rather the computer system 2600 is provided as an example of one type of computing device that may be adapted to perform the functions of an image-based security system, including servers, personal computers, and mobile devices. For example, any suitable processor-based device may be utilized including, without limitation, personal data assistants (PDAs), tablet computers, smartphones, computer game consoles, and multi-processor servers. Moreover, the systems and methods of the present disclosure may be implemented on application specific integrated circuits (ASIC), very large scale integrated (VLSI) circuits, or other circuitry. In fact, persons of ordinary skill in the art may utilize any number of suitable structures capable of executing logical operations according to the described embodiments. For example, the computer system 200 may be virtualized for access by multiple users and/or applications.

In another example, hardware in a computer system may be virtualized through a hypervisor. Users may access the computing system 110 through a hypervisor. The hypervisor may be integrated with the system 110 to provide virtualization of the system 110 without an operating system, such as in the configuration illustrated in FIG. 1. The hypervisor may provide access to the hardware, including the CPU 2602, memory 2602, 2604 and the communications adaptor 2614.

If implemented in firmware and/or software, the functions described above may be stored as one or more instructions or code on a computer-readable medium. Examples include non-transitory computer-readable media encoded with a data structure and computer-readable media encoded with a computer program. Computer-readable media includes physical computer storage media. A storage medium may be any available medium that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to store desired program code in the form of instructions or data structures and that can be accessed by a computer. Disk and disc include compact discs (CD), laser discs, optical discs, digital versatile discs (DVD), floppy disks and Blu-ray discs. Generally, disks reproduce data magnetically, and discs reproduce data optically. Combinations of the above should also be included within the scope of computer-readable media.

In addition to storage on computer readable medium, instructions and/or data may be provided as signals on transmission media included in a communication apparatus. For example, a communication apparatus may include a transceiver having signals indicative of instructions and data. The instructions and data are configured to cause one or more processors to implement the functions outlined in the claims.

The embodiments described herein are implemented as logical operations performed by a computer. The logical operations of these various embodiments of the present invention are implemented (1) as a sequence of computer implemented steps or program modules running on a computing system and/or (2) as interconnected machine modules or hardware logic within the computing system. The implementation is a matter of choice dependent on the performance requirements of the computing system implementing the invention. Accordingly, the logical operations making up the embodiments of the invention described herein can be variously referred to as operations, steps, or modules.

Since other modifications and changes varied to fit particular operating requirements and environments will be apparent to those skilled in the art, the invention is not considered limited to the example chosen for purposes of disclosure, and covers all changes and modifications which do not constitute departures from the true spirit and scope of this invention. This written description provides an illustrative explanation and/or account of the present invention. It may be possible to deliver equivalent benefits using variations of the specific embodiments, without departing from the inventive concept. This description and these drawings, therefore, are to be regarded as illustrative and not restrictive.

Even though particular combinations of features are recited in the present application, these combinations are not intended to limit the disclosure of the invention. In fact, many of these features may be combined in ways not specifically recited in this application. In other words, any of the features mentioned in this application may be included in this new invention in any combination or combinations to allow the functionality required for the desired operations.

No element, act, or instruction used in the present application should be construed as critical or essential to the invention unless explicitly described as such. Further, the phrase "based on" is intended to mean "based, at least in part, on" unless explicitly stated otherwise.

What is claimed is:

1. A method for monitoring security of a facility, the method comprising:

receiving one or more images captured by a plurality of image sources, each of the plurality of image sources having a corresponding field-of-view of one or more locations in a facility;

identifying, via an object-detecting application, one or more objects in the captured one or more images based upon one or more object descriptors associated with the identified one or more objects, wherein the one or more object descriptors include at least one of an image source identity, a location of the one or more objects within the captured one or more images, an object type associated with the one or more objects, a visual characteristic associated with the object type, and/or a timestamp corresponding to a time at which the image containing the identified one or more objects was captured;

generating a facility dashboard display, the dashboard display including a visual display mapping to each of the plurality of image sources having a corresponding field-of-view of the one or more locations in the facility;

applying business logic rules to the identified one or more objects in the captured one or more images to detect a potential, threatened, imminent, or actual security incident in at least one of the one or more locations in the facility; and communicating an alert of the detected potential, threatened, imminent, or actual security incident on the facility dashboard display to indicate a security event in the at least one of the one or more locations in the facility.

2. The method of claim 1, wherein:

the one or more objects include any person, vehicle, or item configured to be identifiable by the object-detecting application.

3. The method of claim 1, wherein:

each of the plurality of image sources comprises an imaging device that captures a digital image of one of the one or more locations in the facility having a defined field-of-view.

4. The method of claim 1, wherein:

communicating the alert comprises visually altering the at least one of the one or more locations on the facility dashboard display by marking the one or more locations with a distinct color.

5. The method of claim 1, wherein:

the facility dashboard display comprises an output on a user device, whereby a user may be capable of selecting a digital image from one of the plurality of image sources when the user selects at least one of the one or more locations in the facility.

6. The method of claim 5, further comprising:

displaying a spatial relationship of a field-of-view corresponding to the selected at least one of the one or more locations relative to a digital image corresponding to an adjacent at least one of the one or more locations.

7. The method of claim 1, further comprising:

selectively retrieving, from a database, business logic rules comprising at least one or more of logic equations using the one or more object descriptors.

8. The method of claim 1, wherein:

the object-detecting application is modeled under principles of artificial intelligence (AI) prescribed to the one or more object descriptors.

9. The method of claim 1, wherein:

the communicated alert is output to a user device capable of accessing the generated facility dashboard display.

10. A system for monitoring security of a facility, the system comprising:

a plurality of image sources each having a corresponding field-of-view of one or more locations in a facility; and a security server communicatively coupled to the plurality of image sources, the security server configured to:

receive one or more images captured by the plurality of image sources;

identify, via an object-detecting application, one or more objects in the captured one or more images based upon one or more object descriptors associated with the identified one or more objects, wherein the one or more object descriptors include at least one of an image source identity, a location of the one or more objects within the captured one or more images, an object type associated with the one or more objects, a visual characteristic associated with the object type, and/or a timestamp corresponding to a time at which the image containing the identified one or more objects was captured;

generate a facility dashboard display, the dashboard display including a visual display mapping to each of the plurality of image sources having a corresponding field-of-view of the one or more locations in the facility;

apply business logic rules to the identified one or more objects in the captured one or more images to detect a potential, threatened, imminent, or actual security incident in at least one of the one or more locations in the facility; and communicate an alert of the detected potential, threatened, imminent, or actual security incident on the facility dashboard display to indicate a security event in the at least one of the one or more locations in the facility.

11. The system of claim 10, wherein:

the one or more objects include any person, vehicle, or item configured to be identifiable by the object-detecting application.

12. The system of claim 10, wherein:

each of the plurality of image sources comprises an imaging device that captures a digital image of one of the one or more locations of the facility having a defined field-of-view.

13. The system of claim 10, wherein:

communicating the alert comprises visually altering the at least one of the one or more locations on the facility dashboard display by marking the one or more locations with a distinct color.

14. The system of claim 10, wherein:

the facility dashboard display comprises an output on a user device, whereby a user may be capable of selecting a digital image from one of the plurality of image sources when the user selects at least one of the one or more locations in the facility.

15. The system of claim 14, wherein:

the security server is configured to display a spatial relationship of a field-of-view corresponding to the selected at least one of the one or more locations relative to a digital image corresponding to an adjacent at least one of the one or more locations.

16. The system of claim 10, wherein:

the security server is configured to selectively retrieve, from a database, business logic rules comprising at least one or more of logic equations using the one or more object descriptors.

17. The system of claim 10, wherein:

the object-detecting application is modeled under principles of artificial intelligence (AI) prescribed to the one or more object descriptors.

18. The system of claim 10, wherein:

the communicated alert is output to a user device capable of accessing the generated facility dashboard.

* * * * *